(12) United States Patent
Mujkic

(10) Patent No.: US 8,775,963 B2
(45) Date of Patent: Jul. 8, 2014

(54) METHOD AND APPARATUS FOR CONTROLLING A DISPLAY TO GENERATE NOTIFICATIONS

(75) Inventor: Alen Mujkic, Mississauga (CA)

(73) Assignee: BlackBerry Limited, Waterloo, Ontario (CA)

( * ) Notice: Subject to any disclaimer, the term of this patent is extended or adjusted under 35 U.S.C. 154(b) by 208 days.

(21) Appl. No.: 12/849,183

(22) Filed: Aug. 3, 2010

(65) Prior Publication Data

US 2011/0260964 A1 Oct. 27, 2011

Related U.S. Application Data

(60) Provisional application No. 61/327,196, filed on Apr. 23, 2010.

(51) Int. Cl.
*G06F 3/048* (2013.01)

(52) U.S. Cl.
USPC .......................... 715/772; 715/774

(58) Field of Classification Search
USPC ................... 715/772, 774, 808, 835
See application file for complete search history.

(56) References Cited

U.S. PATENT DOCUMENTS

| | | | | |
|---|---|---|---|---|
| 6,366,302 | B1 * | 4/2002 | Crosby et al. | 715/786 |
| 7,792,709 | B1 * | 9/2010 | Trandal et al. | 705/26.1 |
| 2004/0155909 | A1 * | 8/2004 | Wagner | 345/854 |
| 2006/0101350 | A1 * | 5/2006 | Scott | 715/779 |
| 2007/0101284 | A1 | 5/2007 | Shaw et al. | |
| 2007/0162871 | A1 * | 7/2007 | Ishii | 715/814 |
| 2007/0237032 | A1 * | 10/2007 | Rhee et al. | 368/10 |
| 2007/0271527 | A1 * | 11/2007 | Paas et al. | 715/810 |
| 2009/0013275 | A1 * | 1/2009 | May et al. | 715/765 |
| 2009/0247112 | A1 | 10/2009 | Lundy et al. | |
| 2009/0249247 | A1 * | 10/2009 | Tseng et al. | 715/808 |
| 2010/0058231 | A1 * | 3/2010 | Duarte et al. | 715/800 |
| 2010/0093316 | A1 * | 4/2010 | Doppler et al. | 455/414.1 |

FOREIGN PATENT DOCUMENTS

| | | |
|---|---|---|
| EP | 2015176 A1 | 1/2009 |
| WO | 2009/097555 A2 | 8/2009 |
| WO | 2010/024986 A2 | 3/2010 |

OTHER PUBLICATIONS

European Patent Application No. 10171777.5 Search Report mailed date May 24, 2011.
"Creating Status Bar Notification", http://developer.android.com/guide/topics/ui/notifiers/notifications.html.
"Notifications in the Status Bar", http://androidcommunity.com/forums/vbglossar.php?do=showentry&id=10.
"Windows Notification Area", http://msdn.microsoft.com/en-us/library/aa511448.aspx.

* cited by examiner

*Primary Examiner* — Omar Abdul-Ali
*Assistant Examiner* — Phuong Nguyen
(74) *Attorney, Agent, or Firm* — Perry + Currier Inc.

(57) ABSTRACT

The present specification provides a method and apparatus for controlling a display based on signals received from one or more input devices. In one implementation, a mobile device with a touch screen and a touch pad is provided. A notification module executable on the mobile device configures the processor of the mobile device to control the display to generate a notification bar and a content region. The notification bar contains an icon representing each application from which a notification has been generated and a number adjacent the icon for indicating how may notifications have been generated by the application. The content region includes data associated with the notifications, and is arranged in rows beneath a header identifying the application. The layout of the applications may be varied as well as the priority of ordering the application sin the content region.

15 Claims, 27 Drawing Sheets

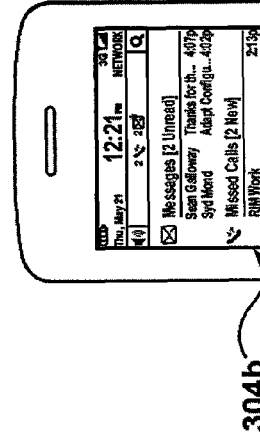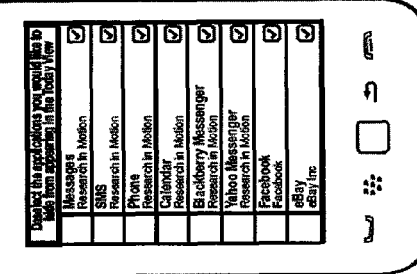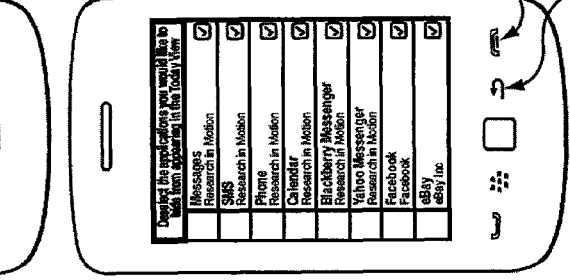
FIG. 24

METHOD AND APPARATUS FOR CONTROLLING A DISPLAY TO GENERATE NOTIFICATIONS

FIELD

The present specification relates generally to computing devices and more particular relates to a method and apparatus for controlling a display to generate notifications.

BACKGROUND

The evolution of computers is currently quite active in the mobile device environment. It is known to include messaging, phone, and social networking functions in mobile devices, and for such functions to generate audible, visual and/or tactile notification of events such as incoming messages, missed calls, social networking advisories, etc.

SUMMARY

A first aspect of the specification provides a method for controlling a display using a processor based on input from one or more input devices to generate application notifications. The method can comprise: controlling a display to generate a notification bar region and a content region, the notification bar region comprising an icon representing each application from which a notification has been generated and a number adjacent the icon for indicating how many notifications have been generated by the application; the content region comprising content that corresponds to data for at least some of the notifications generated by each application; receiving input from an input device to either: generate the content in the content region responsive to causing the notification bar to receive focus, or navigate within the content region.

The notification bar region can be located at a top of the display and the content region can be located there under.

The content in the content region can comprise the data for at least some of the notifications and at least one application heading. When the focus has moved to the at least one application heading and the application heading has been selected via the input device, the method can further comprise launching the respective application by the processor. When the focus has moved to an item in a notification list in the data, and the item has been selected, the method can further comprise the processor causing the item to be displayed.

The content in the content region can comprise multiple notifications arranged beneath each of a plurality of application headers.

The content in the content region can comprise a generic message indicating that there are no new notifications when no new notifications are available.

When the content exceeds the size of a display, a scroll bar can be provided for scrolling down to provide remaining information.

The method can further comprise customizing the content by: providing at least a list of notification generating applications; de-selecting individual applications from the list; providing an indication in the list that the individual applications have been deselected such that notifications there from will only appear as badged on any screen display that shows an associated application icon but not on the notification bar; and saving notification preferences.

The method can further comprise customizing a layout priority of applications appearing in the content region by: providing at least a list of active applications where the active applications are applications that pass notifications for viewing via the notification bar; and, changing an order of priority for display of the active applications by moving the applications in the list based on received input resulting in a re-ordered list of active applications.

A second aspect of the specification provides a computing device comprising: a processor interconnected with a display and one or more input devices, the processor enabled to control the display based on input from the one or more input devices to generate application notifications, the processor further enabled to: control the display to generate a notification bar region and a content region, the notification bar region comprising an icon representing each application from which a notification has been generated and a number adjacent the icon for indicating how many notifications have been generated by the application; the content region comprising content that corresponds to data for at least some of the notifications generated by each application; and receive input from an input device to either: generate the content in the content region responsive to causing the notification bar to receive focus, or navigate within the content region.

The notification bar region can be located at a top of the display and the content region can be located there under.

The content in the content region can comprise the data for the at least some of the notifications and at least one application heading. When the focus has moved to the at least one application heading and the application heading has been selected via the input device, the processor can launch the respective application. When the focus has moved to an item in a notification list in the data, and the item has been selected, the processor can cause the item to be displayed. The content in the content region can comprise multiple notifications arranged beneath each of a plurality of application headers.

The content in the content region can comprise a generic message indicating that there are no new notifications when no new notifications are available.

When the content exceeds the size of a display, the processor can cause a scroll bar to be provided at the display for scrolling down to provide remaining information.

The processor can be further enabled to customize the content by: providing at least a list of notification generating applications; de-selecting individual applications from the list; providing an indication in the list that the individual applications have been deselected such that notifications there from will only appear as badged on any screen display that shows an associated application icon but not on the notification bar; and saving notification preferences.

The processor can be further enabled to customize a layout priority of applications appearing in the content region by:
providing at least a list of active applications where the active applications are applications that pass notifications for viewing via the notification bar; and,
changing an order of priority for display of the active applications by moving the applications in the list via based on received input resulting in a re-ordered list of active applications.

A third aspect of the specification provides a computer program product, comprising a computer usable medium having a computer readable program code adapted to be executed to implement a method for controlling a display using a processor based on input from one or more input devices to generate application notifications, the method comprising: controlling a display to generate a notification bar region and a content region, the notification bar region comprising an icon representing each application from which a notification has been generated and a number adjacent the icon for indicating how many notifications have been generated by the application; the content region comprising content that corresponds to data for at least some of the notifications generated by each application; receiving input from an input device to either: generate the content in the content region responsive to causing the notification bar to receive focus, or navigate within the content region.

BRIEF DESCRIPTION OF THE DRAWINGS

For a better understanding of the various embodiments described herein and to show more clearly how they may be carried into effect, reference will now be made, by way of example only, to the accompanying drawings which show at least one example embodiment and in which:

FIGS. 15-27 show example screens generated on the display of the mobile device of FIG. 6 using the method of FIGS. 13 and 14.

DETAILED DESCRIPTION

Figure 1:
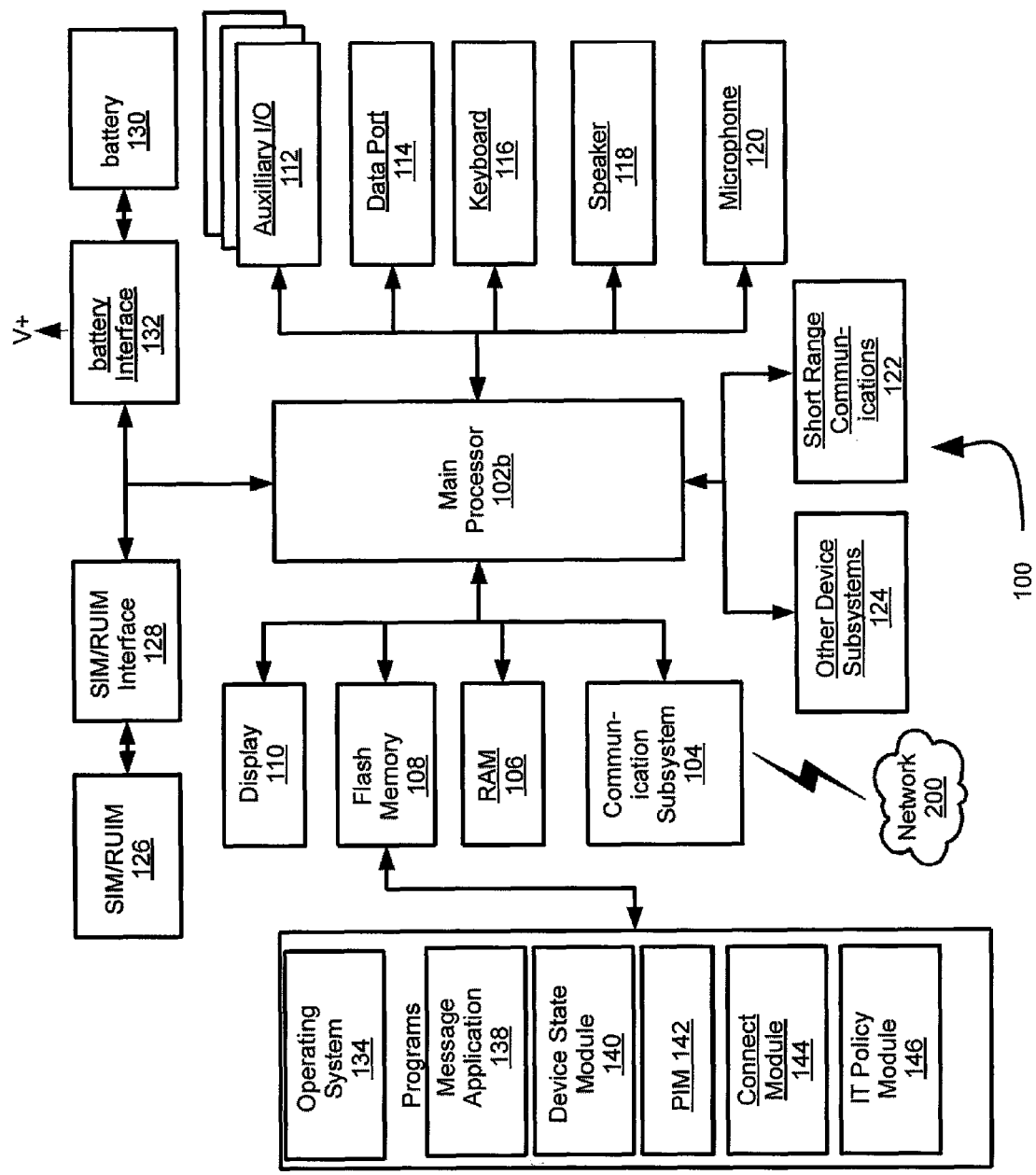
FIG. 1 is a block diagram of an example embodiment of a mobile device.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

The embodiments described herein generally relate to a mobile wireless communication device, hereafter referred to as a mobile device, which can be configured according to an IT (information technology) policy. It should be noted that the term IT policy, in general, refers to a collection of IT policy rules, in which the IT policy rules can be defined as being either grouped or non-grouped and global or per-user. The terms grouped, non-grouped, global and per-user are defined further below. Examples of applicable communication devices include pagers, cellular phones, cellular smartphones, wireless organizers, personal digital assistants, computers, laptops, handheld wireless communication devices, wirelessly enabled notebook computers and the like.

The mobile device is a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities). To aid the reader in understanding the structure of the mobile device and how it communicates with other devices and host systems, reference will now be made to FIGS. 1 through 4.

Referring first to FIG. 1, shown therein is a block diagram of an example embodiment of a mobile device 100. The mobile device 100 includes a number of components such as a main processor 102 that controls the overall operation of the mobile device 100. Communication functions, including data and voice communications, are performed through a communication subsystem 104. The communication subsystem 104 receives messages from and sends messages to a wireless network 200. In this example embodiment of the mobile device 100, the communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 200 associated with mobile device 100 is a GSM/GPRS wireless network in one example implementation, other wireless networks may also be associated with the mobile device 100 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The main processor 102 also interacts with additional subsystems such as a Random Access Memory (RAM) 106 (which can be generally viewed as any type of volatile storage), a flash memory 108 (which can be generally viewed as any type of non-volatile storage), a display 110, an auxiliary input/output (I/O) subsystem 112, a data port 114, a keyboard 116, a speaker 118, a microphone 120, short-range communications 122 and other device subsystems 124.

Some of the subsystems of the mobile device 100 perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list.

The mobile device 100 can send and receive communication signals over the wireless network 200 after required network registration or activation procedures have been completed. Network access is associated with a subscriber or user of the mobile device 100. In certain embodiments, to identify a subscriber, the mobile device 100 utilizes a SIM/RUIM card 126 (i.e. Subscriber Identity Module or a Removable User Identity Module) to be inserted into a SIM/RUIM interface 128 in order to communicate with a network. The SIM card or RUIM 126 is one type of a conventional "smart card" that can be used to identify a subscriber of the mobile device 100 and to personalize the mobile device 100, among other things. Without the SIM card 126, the mobile device 100 is not fully operational for communication with the wireless network 200. By inserting the SIM card/RUIM 126 into the SIM/RUIM interface 128, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM card/RUIM 126 includes a processor and memory for storing information. Once the SIM card/RUIM 126 is inserted into the SIM/RUIM interface 128, it is coupled to the main processor 102. In order to identify the subscriber, the SIM card/RUIM 126 can include some parameters such as an International Mobile Subscriber Identity (IMSI). An advantage of using the SIM card/RUIM 126 is that a subscriber is not necessarily bound by any single physical mobile device. The SIM card/RUIM 126 may store additional subscriber information for a mobile device as well, including datebook (or calendar) information and recent call information. Alternatively, identification information can also be programmed into the flash memory 108.

The mobile device 100 is a battery-powered device and includes a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the mobile device 100. Although current technology makes use of a battery, future technologies such as micro fuel cells may provide the power to the mobile device 100.

The mobile device 100 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, will normally be installed on the mobile device 100 during its manufacture. Other software applications include a message application 138 that can be any suitable software program that allows mobile device 100 to send and receive electronic messages. Various alternatives exist for the message application 138 as is well known to those skilled in the art. Messages that have been sent or received are typically stored in the flash memory 108 of the mobile device 100 or some other suitable storage element in the mobile device 100. In at least some embodiments, some of the sent and received messages may be stored remotely from the device 100 such as in a data store of an associated host system that the mobile device 100 communicates with.

The software applications can further include a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the mobile device 100 is turned off or loses power.

The PIM 142 includes functionality for organizing and managing data items of interest, such as, but not limited to, e-mail, contacts, calendar events, voice mails, appointments, and task items. A PIM application has the ability to send and receive data items via the wireless network 200. PIM data items may be seamlessly integrated, synchronized, and updated via the wireless network 200 with the mobile device subscriber's corresponding data items stored and/or associated with a host computer system. This functionality creates a mirrored host computer on the mobile device 100 with respect to such items. This can be particularly advantageous when the host computer system is the mobile device subscriber's office computer system.

The mobile device 100 also includes a connect module 144, and an IT policy module 146. The connect module 144 implements the communication protocols that are required for the mobile device 100 to communicate with the wireless infrastructure and any host system, such as an enterprise system, that the mobile device 100 is authorized to interface with. Examples of a wireless infrastructure and an enterprise system are given in FIGS. 3 and 4, which are described in more detail below.

The connect module 144 includes a set of APIs (Application Programming Interfaces) that can be integrated with the mobile device 100 to allow the mobile device 100 to use any number of services associated with the enterprise system. The connect module 144 allows the mobile device 100 to establish an end-to-end secure, authenticated communication pipe with the host system. A subset of applications for which access is provided by the connect module 144 can be used to pass IT policy commands from the host system to the mobile device 100. This can be done in a wireless or wired manner. These instructions can then be passed to the IT policy module 146 to modify the configuration of the device 100. Alternatively, in some cases, the IT policy update can also be done over a wired connection.

The IT policy module 146 receives IT policy data that encodes the IT policy. The IT policy module 146 then ensures that the IT policy data is authenticated by the mobile device 100. The IT policy data can then be stored in the flash memory 106 in its native form. After the IT policy data is stored, a global notification can be sent by the IT policy module 146, to all of the applications residing on the mobile device 100. Applications for which the IT policy may be applicable then respond by reading the IT policy data to look for IT policy rules that are applicable.

The IT policy module 146 can include a parser (not shown), which can be used by the applications to read the IT policy rules. In some cases, another module or application can provide the parser. Grouped IT policy rules, described in more detail below, are retrieved as byte streams, which are then sent (recursively, in a sense) into the parser to determine the values of each IT policy rule defined within the grouped IT policy rule. In at least some embodiments, the IT policy module 146 can determine which applications are affected by the IT policy data and send a notification to only those applications. In either of these cases, for applications that aren't running at the time of the notification, the applications can call the parser or the IT policy module 146 when they are executed to determine if there are any relevant IT policy rules in the newly received IT policy data.

All applications that support rules in the IT Policy are coded to know the type of data to expect. For example, the value that is set for the "WEP User Name" IT policy rule is known to be a string; therefore the value in the IT policy data that corresponds to this rule is interpreted as a string. As another example, the setting for the "Set Maximum Password Attempts" IT policy rule is known to be an integer, and therefore the value in the IT policy data that corresponds to this rule is interpreted as such.

After the IT policy rules have been applied to the applicable applications or configuration files, the IT policy module 146 sends an acknowledgement back to the host system to indicate that the IT policy data was received and successfully applied.

Other types of software applications can also be installed on the mobile device 100. These software applications can be third party applications, which are added after the manufacture of the mobile device 100. Examples of third party applications include social networking, games, calculators, utilities, etc.

The additional applications can be loaded onto the mobile device 100 through at least one of the wireless network 200, the auxiliary I/O subsystem 112, the data port 114, the short-range communications subsystem 122, or any other suitable device subsystem 124. This flexibility in application installation increases the functionality of the mobile device 100 and may provide enhanced on-device functions, communication-related functions, or both. For example, secure communication applications may enable electronic commerce functions and other such financial transactions to be performed using the mobile device 100.

The data port 114 enables a subscriber to set preferences through an external device or software application and extends the capabilities of the mobile device 100 by providing for information or software downloads to the mobile device 100 other than through a wireless communication network. The alternate download path may, for example, be used to load an encryption key onto the mobile device 100 through a direct and thus reliable and trusted connection to provide secure device communication.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the battery 130 of the mobile device 100.

The short-range communications subsystem 122 provides for communication between the mobile device 100 and different systems or devices, without the use of the wireless network 200. For example, the subsystem 122 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download will be processed by the communication subsystem 104 and input to the main processor 102. The main processor 102 will then process the received signal for output to the display 110 or alternatively to the auxiliary I/O subsystem 112. A subscriber may also compose data items, such as e-mail messages, for example, using the keyboard 116 in conjunction with the display 110 and possibly the auxiliary I/O subsystem 112. The auxiliary subsystem 112 may include devices such as: a demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156. The DSP 160 not only processes communication signals, but also provides for receiver and transmitter control. For example, the gains applied to communication signals in the receiver 150 and the transmitter 152 may be adaptively controlled through automatic gain control algorithms implemented in the DSP 160.

The wireless link between the mobile device 100 and the wireless network 200 can contain one or more different channels, typically different RF channels, and associated protocols used between the mobile device 100 and the wireless network 200. An RF channel is a limited resource that must be conserved, typically due to limits in overall bandwidth and limited battery power of the mobile device 100.

When the mobile device 100 is fully operational, the transmitter 152 is typically keyed or turned on only when it is transmitting to the wireless network 200 and is otherwise turned off to conserve resources. Similarly, the receiver 150 is periodically turned off to conserve power until it is needed to receive signals or information (if at all) during designated time periods.

Figure 3:
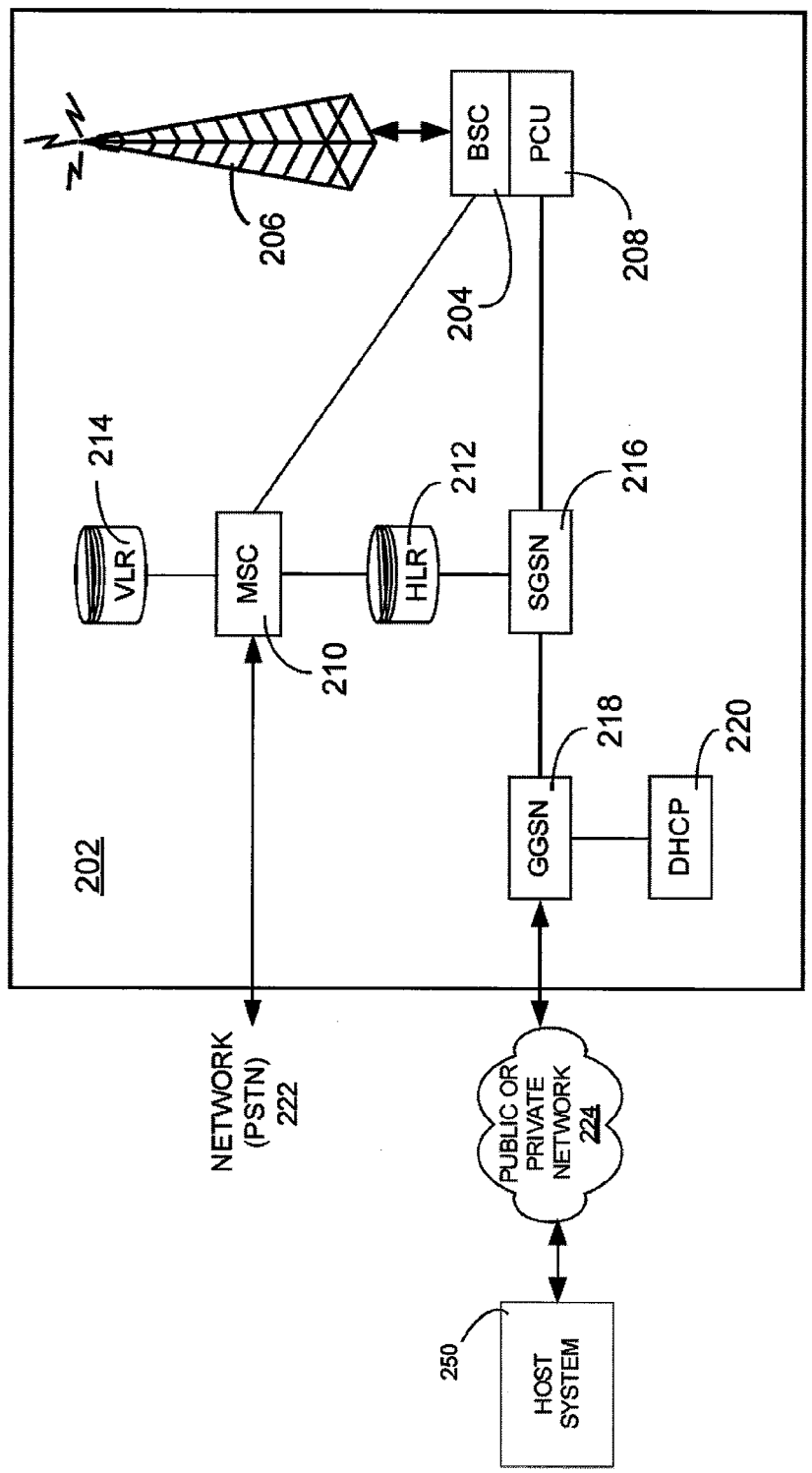
FIG. 3 is an example block diagram of a node of a wireless network.

Referring now to FIG. 3, a block diagram of an example implementation of a node 202 of the wireless network 200 is shown. In practice, the wireless network 200 comprises one or more nodes 202. In conjunction with the connect module 144, the mobile device 100 can communicate with the node 202 within the wireless network 200. In the example implementation of FIG. 3, the node 202 is configured in accordance with General Packet Radio Service (GPRS) and Global Systems for Mobile (GSM) technologies. The node 202 includes a base station controller (BSC) touch screen, mouse, track ball, infrared fingerprint detector, or a roller wheel with dynamic button pressing capability. The keyboard 116 is preferably an alphanumeric keyboard and/or telephone-type keypad. However, other types of keyboards may also be used. A composed item may be transmitted over the wireless network 200 through the communication subsystem 104.

For voice communications, the overall operation of the mobile device 100 is substantially similar, except that the received signals are output to the speaker 118, and signals for transmission are generated by the microphone 120. Alternative voice or audio I/O subsystems, such as a voice message recording subsystem, can also be implemented on the mobile device 100. Although voice or audio signal output is accomplished primarily through the speaker 118, the display 110 can also be used to provide additional information such as the identity of a calling party, duration of a voice call, or other voice call related information.

Figure 2:
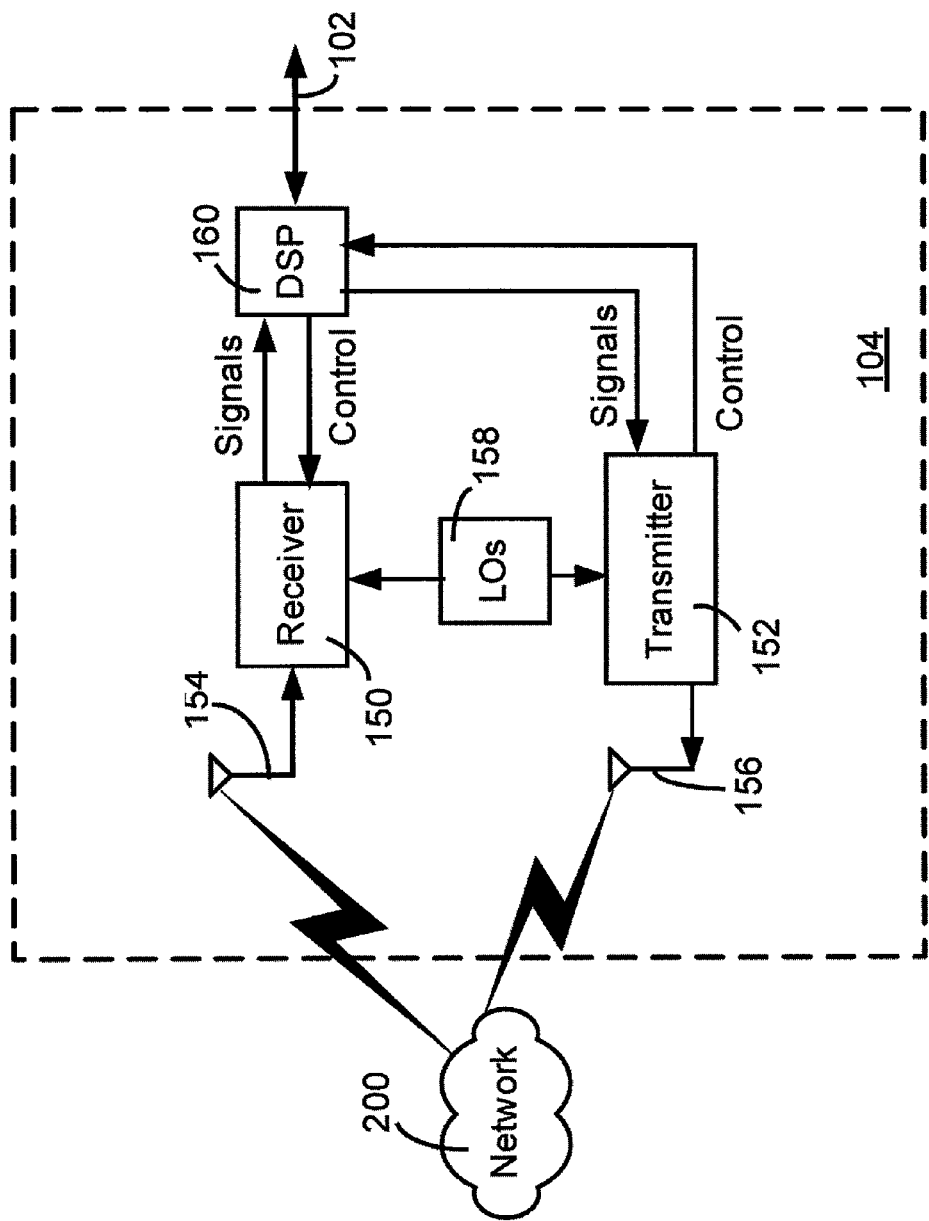
FIG. 2 is a block diagram of an example embodiment of a communication subsystem component of the mobile device of FIG. 1.

Referring now to FIG. 2, an example block diagram of the communication subsystem component 104 is shown. The communication subsystem 104 includes a receiver 150, a transmitter 152, as well as associated components such as one or more embedded or internal antenna elements 154 and 156, Local Oscillators (LOs) 158, and a processing module such as a Digital Signal Processor (DSP) 160. The particular design of the communication subsystem 104 is dependent upon the communication network 200 with which the mobile device 100 is intended to operate. Thus, it should be understood that the design illustrated in FIG. 2 serves only as one example.

Signals received by the antenna 154 through the wireless network 200 are input to the receiver 150, which may perform such common receiver functions as signal amplification, frequency down conversion, filtering, channel selection, and analog-to-digital (A/D) conversion. A/D conversion of a received signal allows more complex communication functions such as 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through the network 200.

In a GSM network, the MSC 210 is coupled to the BSC 204 and to a landline network, such as a Public Switched Telephone Network (PSTN) 222 to satisfy circuit switched requirements. The connection through the PCU 208, the SGSN 216 and the GGSN 218 to a public or private network (Internet) 224 (also referred to herein generally as a shared network infrastructure) represents the data path for GPRS capable mobile devices. In a GSM network extended with GPRS capabilities, the BSC 204 also contains the Packet Control Unit (PCU) 208 that connects to the SGSN 216 to control segmentation, radio channel allocation and to satisfy packet switched requirements. To track the location of the mobile device 100 and availability for both circuit switched and packet switched management, the HLR 212 is shared between the MSC 210 and the SGSN 216. Access to the VLR 214 is controlled by the MSC 210.

The station 206 is a fixed transceiver station and together with the BSC 204 form fixed transceiver equipment. The fixed transceiver equipment provides wireless network coverage for a particular coverage area commonly referred to as a "cell". The fixed transceiver equipment transmits communication signals to and receives communication signals from mobile devices within its cell via the station 206. The fixed transceiver equipment normally performs such functions as modulation and possibly encoding and/or encryption of signals to be transmitted to the mobile device 100 in accordance with particular, usually predetermined, communication protocols and parameters, under control of its controller. The fixed transceiver equipment similarly demodulates and possibly decodes and decrypts, if necessary, any communication signals received from the mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a profile is stored in the HLR 212. The HLR 212 also contains location information for each registered mobile device and can be queried to determine the current location of a mobile device. The MSC 210 is responsible for a group of location areas and stores the data of the mobile devices currently in its area of responsibility in the VLR 214. Further, the VLR 214 also contains information on mobile devices that are visiting other networks. The information in the VLR 214 includes part of the permanent mobile device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time requiring less use of computing resources.

The SGSN 216 and the GGSN 218 are elements added for GPRS support; namely packet switched data support, within GSM. The SGSN 216 and the MSC 210 have similar responsibilities within the wireless network 200 by keeping track of the location of each mobile device 100. The SGSN 216 also performs security functions and access control for data traffic on the wireless network 200. The GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP (Dynamic Hosting Control Protocol) server 220 connected to the GGSN 218. There are many mechanisms for dynamic IP address assignment, including using a combination of a Remote Authentication Dial-In User Service (RADIUS) server and a DHCP server. Once the GPRS Attach is complete, a logical connection is established from a mobile device 100, through the PCU 208, and the SGSN 216 to an Access Point Node (APN) within the GGSN 218. The APN represents a logical end of an IP tunnel that can either access direct Internet compatible services or private network connections. The APN also represents a security mechanism for the network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach operation is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, the network 200 will run an idle timer for each PDP Context to determine if there is a lack of activity. When a mobile device 100 is not using its PDP Context, the PDP Context can be de-allocated and the IP address returned to the IP address pool managed by the DHCP server 220.

Figure 4:
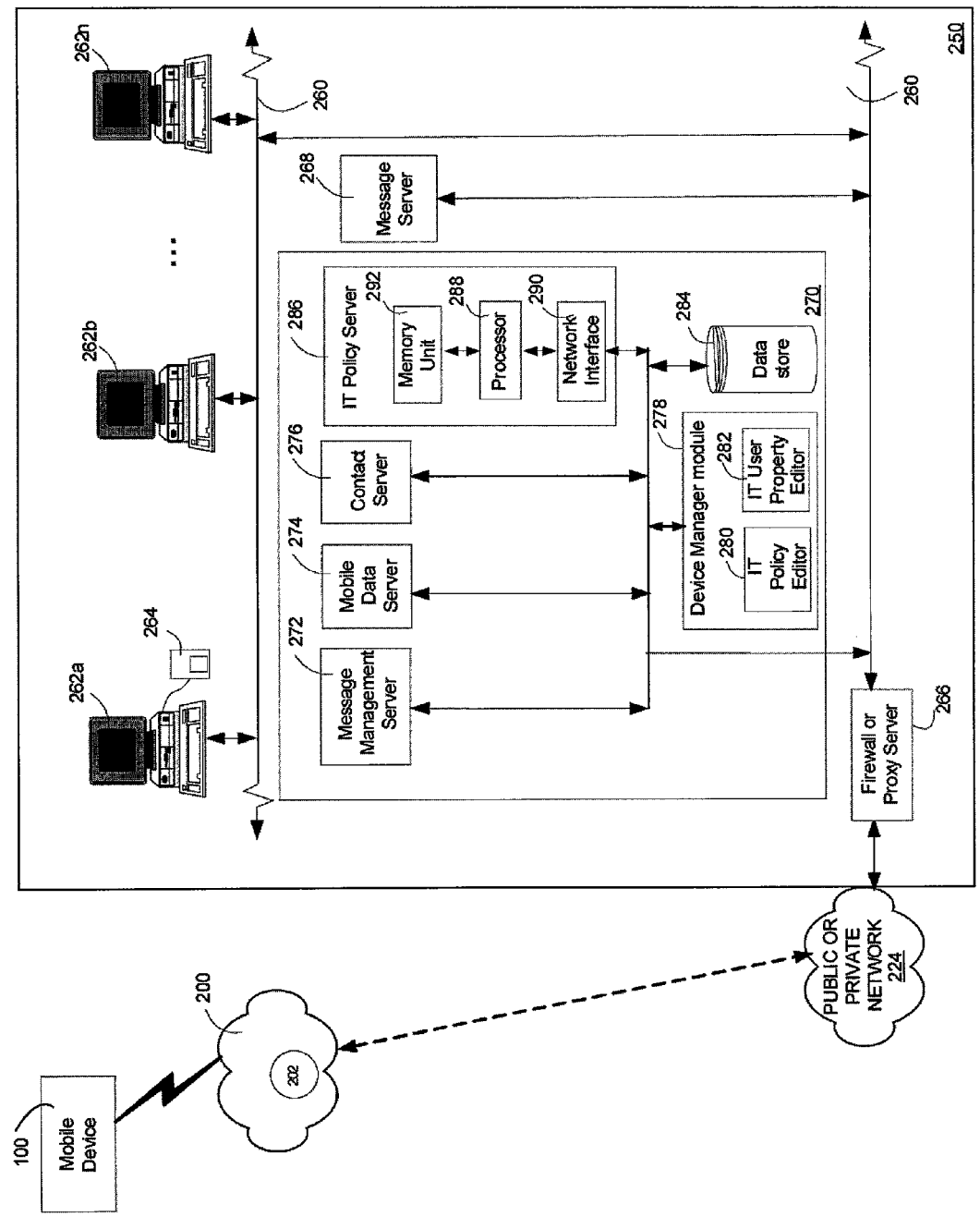
FIG. 4 is a block diagram illustrating components of a host system in one example configuration for use with the wireless network of FIG. 3 and the mobile device of FIG. 1.

Referring now to FIG. 4, shown therein is a block diagram illustrating components of an example configuration of a host system 250 that the mobile device 100 can communicate with in conjunction with the connect module 144. The host system 250 will typically be a corporate enterprise network or other local area network (LAN), but may also be a home office computer or some other private system, for example, in variant implementations. In this example shown in FIG. 4, the host system 250 is depicted as a LAN of an organization to which the mobile device 100 is associated. Typically, a plurality of mobile devices can communicate wirelessly with the host system 250 through one or more nodes 202 of the wireless network 200.

The host system 250 comprises a number of network components connected to each other by a network 260. For instance, a desktop computer 262a with an accompanying cradle 264 for the mobile device 100 is situated on a LAN connection. The cradle 264 for the mobile device 100 can be coupled to the computer 262a by a serial or a Universal Serial Bus (USB) connection, for example. Other computers 262b-262n are also situated on the network 260, and each may or may not be equipped with an accompanying cradle 264. The cradle 264 facilitates the loading of information (e.g. PIM data, private symmetric encryption keys to facilitate secure communications) from the user computer 262a to the mobile device 100, and may be particularly useful for bulk information updates often performed in initializing the mobile device 100 for use. The information downloaded to the mobile device 100 may include certificates used in the exchange of messages.

It will be understood by persons skilled in the art that the user computers 262a-262n will typically also be connected to other peripheral devices, such as printers, etc., which are not explicitly shown in FIG. 4. Furthermore, only a subset of network components of the host system 250 are shown in FIG. 4 for ease of exposition, and it will be understood by persons skilled in the art that the host system 250 will comprise additional components that are not explicitly shown in FIG. 4 for this example configuration. More generally, the host system 250 may represent a smaller part of a larger network (not shown) of the organization, and may comprise different components and/or be arranged in different topologies than that shown in the example embodiment of FIG. 4.

To facilitate the operation of the mobile device 100 and the wireless communication of messages and message-related data between the mobile device 100 and components of the host system 250, a number of wireless communication support components 270 can be provided. In some implementations, the wireless communication support components 270 can include a message management server 272, a mobile data server 274, a contact server 276, and a device manager module 278. The device manager module 278 includes an IT Policy editor 280 and an IT user property editor 282, as well as other software components for allowing an IT administrator to configure the mobile devices 100. In an alternative embodiment, there may be one editor that provides the functionality of both the IT policy editor 280 and the IT user property editor 282. The support components 270 also include a data store 284, and an IT policy server 286. The IT policy server 286 includes a processor 288, a network interface 290 and a memory unit 292. The processor 288 controls the operation of the IT policy server 286 and executes functions related to the standardized IT policy as described below. The network interface 290 allows the IT policy server 286 to communicate with the various components of the host system 250 and the mobile devices 100. The memory unit 292 can store functions used in implementing the IT policy as well as related data. Those skilled in the art know how to implement these various components. Other components may also be included as is well known to those skilled in the art. Further, in some implementations, the data store 284 can be part of any one of the servers.

In this example embodiment, the mobile device 100 communicates with the host system 250 through node 202 of the wireless network 200 and a shared network infrastructure 224 such as a service provider network or the public Internet. Access to the host system 250 may be provided through one or more routers (not shown), and computing devices of the host system 250 may operate from behind a firewall or proxy server 266. The proxy server 266 provides a secure node and a wireless internet gateway for the host system 250. The proxy server 266 intelligently routes data to the correct destination server within the host system 250.

In some implementations, the host system 250 can include a wireless VPN router (not shown) to facilitate data exchange between the host system 250 and the mobile device 100. The wireless VPN router allows a VPN connection to be established directly through a specific wireless network to the mobile device 100. The wireless VPN router can be used with the Internet Protocol (IP) Version 6 (IPV6) and IP-based wireless networks. This protocol can provide enough IP addresses so that each mobile device has a dedicated IP address, making it possible to push information to a mobile device at any time. An advantage of using a wireless VPN router is that it can be an off-the-shelf VPN component, and does not require a separate wireless gateway and separate wireless infrastructure. A VPN connection can preferably be a Transmission Control Protocol (TCP)/IP or User Datagram Protocol (UDP)/IP connection for delivering the messages directly to the mobile device 100 in this alternative implementation.

Messages intended for a user of the mobile device 100 are initially received by a message server 268 of the host system 250. Such messages may originate from any number of sources. For instance, a message may have been sent by a sender from the computer 262b within the host system 250, from a different mobile device (not shown) connected to the wireless network 200 or a different wireless network, or from a different computing device, or other device capable of sending messages, via the shared network infrastructure 224, possibly through an application service provider (ASP) or Internet service provider (ISP), for example.

The message server 268 typically acts as the primary interface for the exchange of messages, particularly e-mail messages, within the organization and over the shared network infrastructure 224. Each user in the organization that has been set up to send and receive messages is typically associated with a user account managed by the message server 268. Some example implementations of the message server 268 include a Microsoft Exchange™ server, a Lotus Domino™ server, a Novell Groupwise™ server, or another suitable mail server installed in a corporate environment. In some implementations, the host system 250 may comprise multiple message servers 268. The message server 268 may also be adapted to provide additional functions beyond message management, including the management of data associated with calendars and task lists, for example.

When messages are received by the message server 268, they are typically stored in a data store associated with the message server 268. In at least some embodiments, the data store may be a separate hardware unit, such as data store 284, that the message server 268 communicates with. Messages can be subsequently retrieved and delivered to users by accessing the message server 268. For instance, an e-mail client application operating on a user's computer 262a may request the e-mail messages associated with that user's account stored on the data store 284 associated with the message server 268. These messages are then retrieved from the data store 284 and stored locally on the computer 262a. The data store 284 associated with the message server 268 can store copies of each message that is locally stored on the mobile device 100. Alternatively, the data store 284 associated with the message server 268 can store all of the messages for the user of the mobile device 100 and only a smaller number of messages can be stored on the mobile device 100 to conserve memory. For instance, the most recent messages (i.e. those received in the past two to three months for example) can be stored on the mobile device 100.

When operating the mobile device 100, the user may wish to have e-mail messages retrieved for delivery to the mobile device 100. The message application 138 operating on the mobile device 100 may also request messages associated with the user's account from the message server 268. The message application 138 may be configured (either by the user or by an administrator, possibly in accordance with an organization's information technology (IT) policy) to make this request at the direction of the user, at some pre-defined time interval, or upon the occurrence of some pre-defined event. In some implementations, the mobile device 100 is assigned its own e-mail address, and messages addressed specifically to the mobile device 100 are automatically redirected to the mobile device 100 as they are received by the message server 268.

The message management server 272 can be used to specifically provide support for the management of messages, such as e-mail messages, that are to be handled by mobile devices. Generally, while messages are still stored on the message server 268, the message management server 272 can be used to control when, if, and how messages are sent to the mobile device 100. The message management server 272 also facilitates the handling of messages composed on the mobile device 100, which are sent to the message server 268 for subsequent delivery.

For example, the message management server 272 may monitor the user's "mailbox" (e.g. the message store associated with the user's account on the message server 268) for new e-mail messages, and apply user-definable filters to new messages to determine if and how the messages are relayed to the user's mobile device 100. The message management server 272 may also compress and encrypt new messages (e.g. using an encryption technique such as Data Encryption Standard (DES), Triple DES, or Advanced Encryption Standard (AES)) and push them to the mobile device 100 via the shared network infrastructure 224 and the wireless network 200. The message management server 272 may also receive messages composed on the mobile device 100 (e.g. encrypted using Triple DES), decrypt and decompress the composed messages, re-format the composed messages if desired so that they will appear to have originated from the user's computer 262a, and re-route the composed messages to the message server 268 for delivery.

Certain properties or restrictions associated with messages that are to be sent from and/or received by the mobile device 100 can be defined (e.g. by an administrator in accordance with IT policy) and enforced by the message management server 272. These may include whether the mobile device 100 may receive encrypted and/or signed messages, minimum encryption key sizes, whether outgoing messages must be encrypted and/or signed, and whether copies of all secure messages sent from the mobile device 100 are to be sent to a pre-defined copy address, for example.

The message management server 272 may also be adapted to provide other control functions, such as only pushing certain message information or pre-defined portions (e.g. "blocks") of a message stored on the message server 268 to the mobile device 100. For example, in some cases, when a message is initially retrieved by the mobile device 100 from the message server 268, the message management server 272 may push only the first part of a message to the mobile device 100, with the part being of a pre-defined size (e.g. 2 KB). The user can then request that more of the message be delivered in similar-sized blocks by the message management server 272 to the mobile device 100, possibly up to a maximum pre-defined message size. Accordingly, the message management server 272 facilitates better control over the type of data and the amount of data that is communicated to the mobile device 100, and can help to minimize potential waste of bandwidth or other resources.

The mobile data server 274 encompasses any other server that stores information that is relevant to the corporation. The mobile data server 274 may include, but is not limited to, databases, online data document repositories, customer relationship management (CRM) systems, or enterprise resource planning (ERP) applications.

The contact server 276 can provide information for a list of contacts for the user in a similar fashion as the address book on the mobile device 100. Accordingly, for a given contact, the contact server 276 can include the name, phone number, work address and e-mail address of the contact, among other information. The contact server 276 can also provide a global address list that contains the contact information for all of the contacts associated with the host system 250.

It will be understood by persons skilled in the art that the message management server 272, the mobile data server 274, the contact server 276, the device manager module 278, the data store 284 and the IT policy server 286 do not need to be implemented on separate physical servers within the host system 250. For example, some or all of the functions associated with the message management server 272 may be integrated with the message server 268 or some other server in the host system 250. Alternatively, the host system 250 may comprise multiple message management servers 272, particularly in variant implementations where a large number of mobile devices need to be supported.

Alternatively, in some embodiments, the IT policy server 286 can provide the IT policy editor 280, the IT user property editor 282 and the data store 284. In some cases, the IT policy server 286 can also provide the device manager module 278. The processor 288 of the IT policy server 286 can be used to perform the various steps of a method for providing IT policy data that is customizable on a per-user basis as explained further below and in conjunction with FIGS. 5 to 8. The processor 288 can execute the editors 280 and 282. In some cases, the functionality of the editors 280 and 282 can be provided by a single editor. In some cases, the memory unit 292 can provide the data store 284.

The device manager module 278 provides an IT administrator with a graphical user interface with which the IT administrator interacts to configure various settings for the mobile devices 100. As mentioned, the IT administrator can use IT policy rules to define behaviors of certain applications on the mobile device 100 that are permitted such as phone, web browser or Instant Messenger use. The IT policy rules can also be used to set specific values for configuration settings that an organization requires on the mobile devices 100 such as auto signature text, WLAN/VoIP/PN configuration, security requirements (e.g. encryption algorithms, password rules, etc.), specifying themes or applications that are allowed to run on the mobile device 100, and the like.

It is to be emphasized that the foregoing provides non-limiting examples of configurations for mobile device 100, host system 250. For example, it is to be understood that mobile device 100 is purely an example, and it will be apparent to those skilled in the art that a variety of different portable electronic device structures are contemplated. Indeed variations on mobile device 100 can include, without limitation, a cellular telephone, a portable email paging device, a camera, a portable music player, a portable video player, and/or a portable video game player. Other contemplated variations include devices which are not necessarily portable, such as desktop computers.

Figure 5:
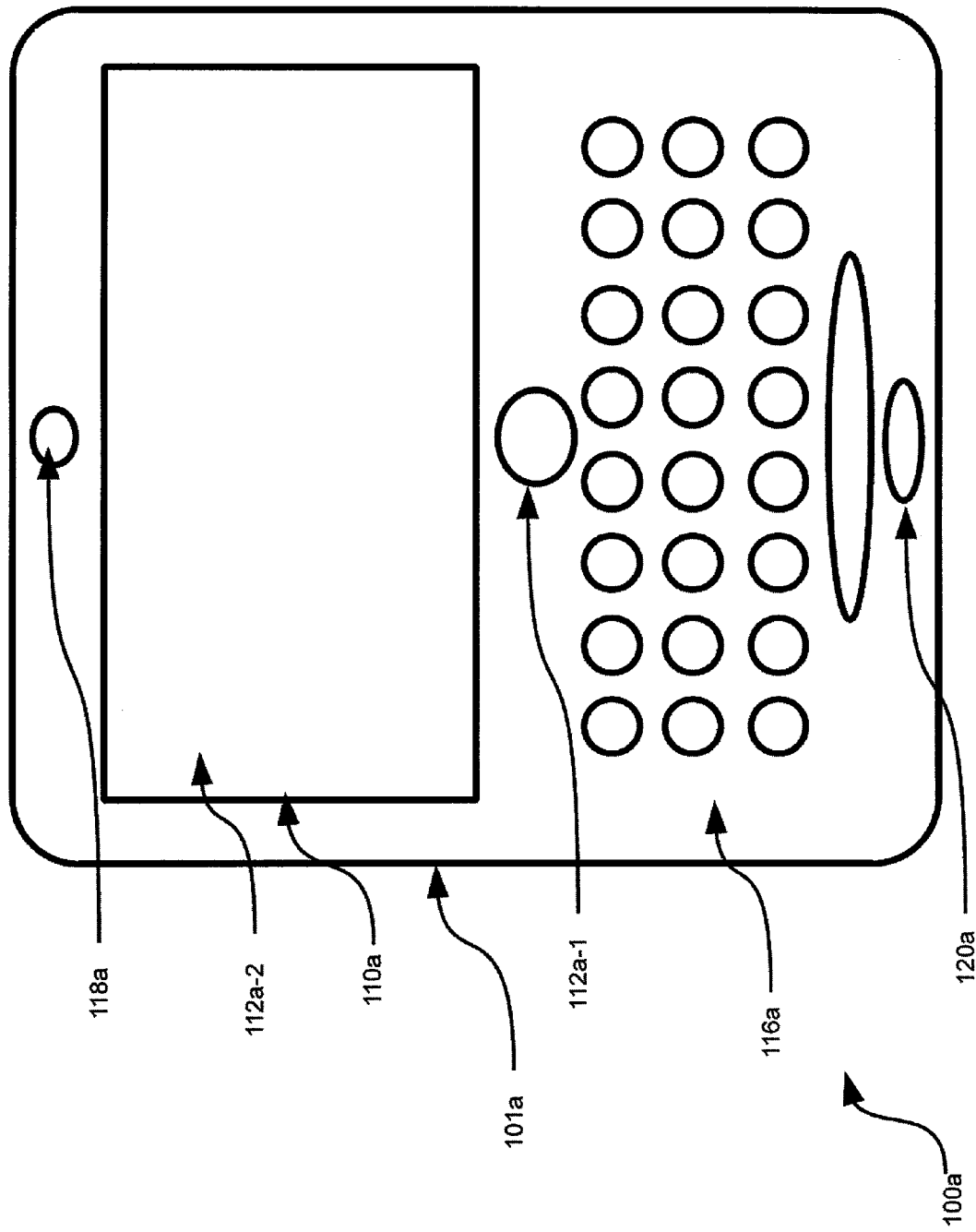
FIG. 5 is a schematic representation of an appearance of a mobile device according to FIG. 1.

Referring now to FIG. 5, a specific contemplated variation of device 100 is indicated at 100*a*. Mobile device 100*a* contains several of the same components as device 100, or variations on them, and accordingly, like components bear like references, except followed by the suffix "a". However, while FIG. 1 showed a block diagram of the internal components of device 100, FIG. 5 shows an example physical appearance and structure for device 100*a*. Of note is that FIG. 5 shows the mobile device 100*a* as comprising a chassis 101*a* that supports display 110*a*. Display 110*a* can comprise one or more light emitters such as an array of light emitting diodes (LED), liquid crystals, plasma cells, or organic light emitting diodes (OLED). Other types of light emitters are contemplated. Chassis 101*a* also supports keyboard 116*a*. It is to be understood that this specification is not limited to any particular structure, spacing, pitch or shape of keyboard 116*a*, and the depiction in FIG. 5 is purely example. For example, full or reduced "QWERTY" keyboards are contemplated. Other types of keyboards are contemplated. Device 100*a* also comprises a first pointing device 112*a*-1 which in a present embodiment is implemented as a touch-pad, but in other embodiments can be implemented as a joystick, trackball or track-wheel. Device 100*a* also comprises a second pointing device 112*a*-2 which in a present embodiment is implemented as a touch-sensitive membrane disposed over display 110*a*, thereby providing a touch-screen for device 100*a*. While two pointing devices 112*a*-1 and 112*a*-2, it is to be understood that in variations, only one pointing device 112*a*-1 and 112*a*-2 may be provided. It should also be understood that other types of input devices are contemplated, including input devices which are structurally different than the specific examples provided are contemplated, but are also functionally equivalent and able to, for example, receive "swipe" inputs and send an electrical signal representing such an input to processor 102*b*. Device 100*a* also comprises a speaker 118*a* for generating audio output, and a microphone 120*a* for receiving audio input.

Figure 6:
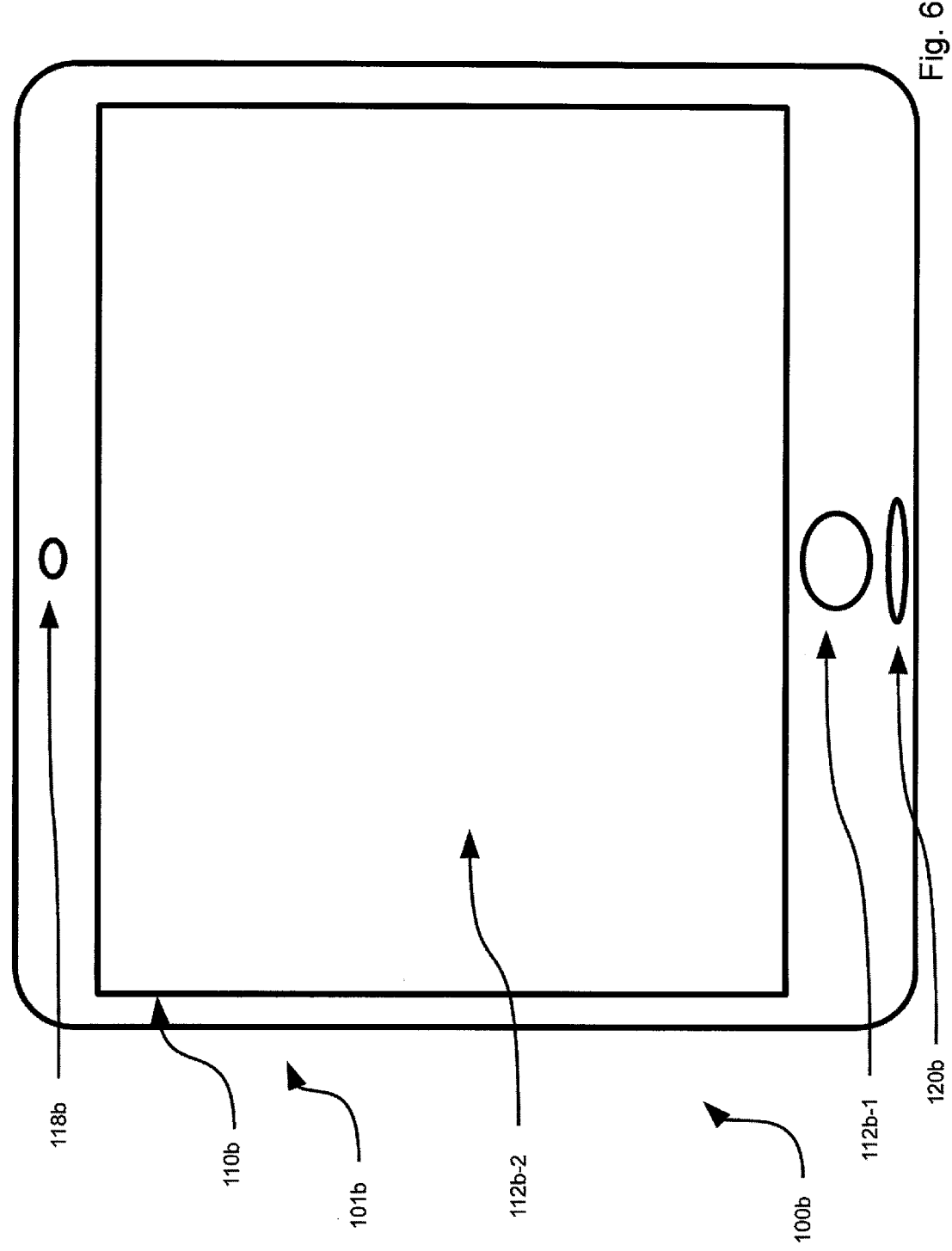
FIG. 6 is a schematic representation of an appearance of another mobile device.

Referring now to FIG. 6, another specific contemplated variation of device 100 is indicated at 100*b*. Mobile device 100*b* contains several of the same components as device 100*a*, or variations on them, and accordingly, like components bear like references, except followed by the suffix "b". Of note is that in FIG. 6, keyboard 116*a* is not provided, while two pointing devices 112*b*-1 and 112*b*-2 are provided. Again, in a variation of device 100*b*, only one of pointing devices 112*b*-1 and 112*b*-2 may be provided, although in such a variation, typically second pointing device 112*b*-2 is provided in order to provide a touch-screen for device 100*b*.

Figure 7:
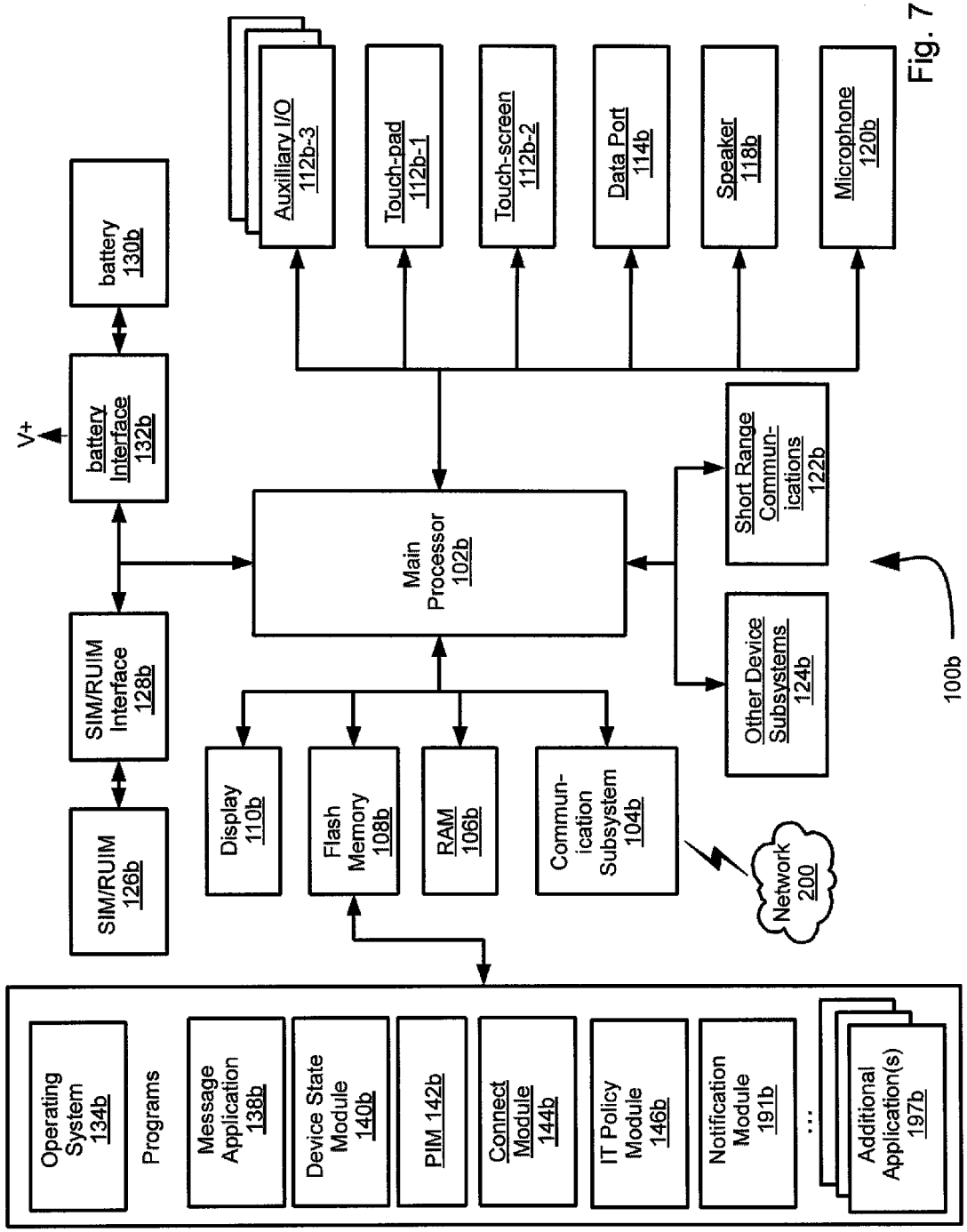
FIG. 7 is a block diagram of the mobile device of FIG. 6.

For convenience, the following discussion is made with reference to mobile device 100*b*; including both pointing devices 112*b*-1 and 112*b*-2, but upon reading the remainder of this specification, those skilled in the art will become able to appreciate how the following discussions can be applied to variations of mobile device 100*b*. To that end, FIG. 7 shows a block diagram of device 100*b*. FIG. 7 is a modified version of FIG. 1, and of note FIG. 7 specifically labels touch-pad 112*b*-1 and touch-screen 112*b*-2, and shows auxiliary inputs 112*b*-3 which, in the embodiment of FIG. 7 may be optional. Examples of auxiliary inputs include buttons for invoking menu features, escape, as well as phone call start and phone call end, as is known in the art. Also of note is that, in a present non-limiting example implementation, touch-pad 112*b*-1 is configured to not only be sensitive to touch inputs, but touch-pad 112*b*-1 is also mechanically structured as a mechanical switch, such that it can also be mechanically depressed and moved in a direction that is normal to the surface of touch-pad 112*b*-1. The mechanical switch is also spring biased towards a non-depressed position, so that upon release the mechanical switch returns to the non-depressed position. Accordingly, touch-pad 112*b*-1 is configured to receive selection inputs by mechanical depression of touch-pad 112*b*-1, while touch-screen 112*b*-2 is configured to receive selection inputs corresponding to screen focus by a tap received on touch-screen 112*b*-2. It should be noted, however, that in variations, touch-pad 112*b*-1 can additionally be configured, or alternatively configured, to receive selection inputs by a tap received on touch-pad 112*b*-1. Where touch-pad 112*b*-1 can received a tap input, then the mechanical switch can be removed from touch-pad 112*b*-1 altogether.

While not shown, in another variation it should be understood that touch-screen 112*b*-2 can also be varied to also include a mechanical switch so that a force on touch-screen 112*b*-2 will select (i.e. "click") an item that is in focus on touch screen 112*b*-2. Such a mechanical switch can be provided for touch-screen 112*b*-2 either in lieu of, or in addition to, the "tap" input capability provided for touch-screen 112*b*-2.

FIG. 7 also specifically labels, as part of device 100*b*, a notification module 191*b* and additional applications 197*b*, such as applications for messaging, SMS, phone, calendar, messenger, social networking, etc.

As discussed above, it is known to provide various functions, such as calendaring, contacts, and messaging functions in a mobile device, such as the device 110*a* or 100*b*. Often, the icons for launching such functions are located in disparate locations such as different locations on a screen or within different screens generated by the display 110*a* or 110*b*. For example, an icon for launching a function may be located at the top of a screen, at the bottom of a list, or can be located within a folder that is accessible via a display screen. It is also known for such functions to generate audible, visual and/or tactile notification of events such as incoming messages, missed calls, social networking advisories, etc. According to one method and apparatus for controlling a display of a mobile device to generate such notifications, computer-generated icons are displayed to indicate which application generated the notification. A user of the device then navigates through the various displays and folders etc. in to find the application that generated the notification, and then launches the application in order to determine what the notification relates to. The time and number of keystroke/button pushes required to navigate to the application has a negative technical impact on operation of the mobile device. For example, the time that it takes for the application to be located results in power utilization for operating the display and therefore contributes to battery consumption. Also, the keystroke/button pushes required to navigate to the application contributes to mechanical wear.

Therefore, there exists a technical problem in how to reduce the time and number of keystrokes required to determine what a notification relates to.

FIGS. 8-23 illustrate non-limiting examples of a method and apparatus for controlling a display, such as display 110b, to generate notifications in such a way as to reduce the time and number of keystrokes it takes to determine what the notifications relate to, which can result in less power utilization for operating the display, leading to prolonged life of battery 130, as well as reduced mechanical wear on components of the auxiliary input/output (I/O) subsystem 112, such as touch pad 112b-1 and 112b-2.

Figure 8:
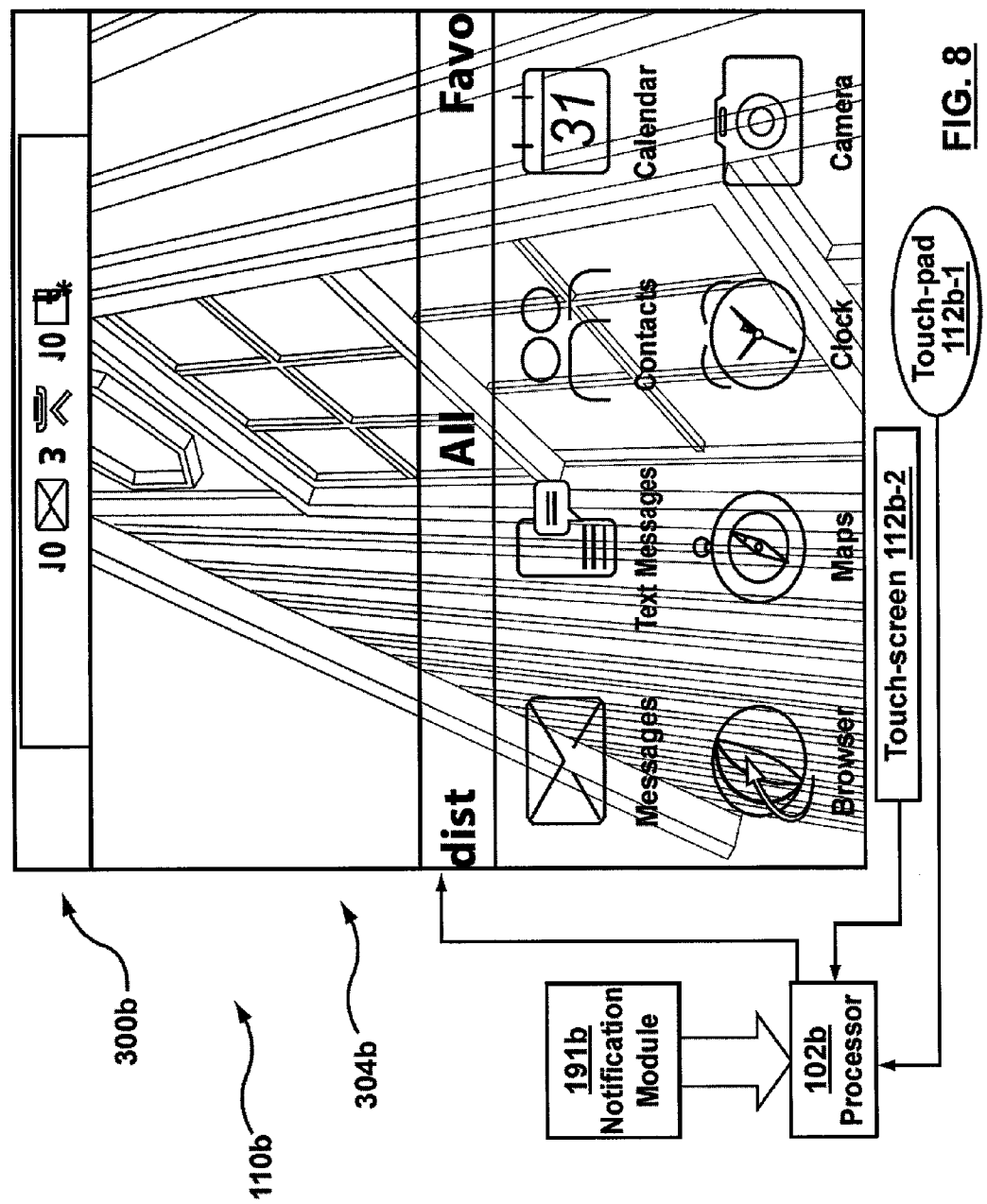
FIG. 8 is an example of a first screen generated on the display of the mobile device of FIG. 6.

FIG. 8 shows a non-limiting example of execution of notification module 191b on processor 102b, so that processor 102b is configured to control display 110b so as to generate a first display screen having a notification bar 300b and a content region 304b.

Content region 304b shows a plurality of icons for launching various applications for providing functions such as message, text message, contacts, calendar, browser, maps, clock and camera. The configuration of content region 304b is non-limiting. Other application icons may be included, icons may be omitted, and the icons may be configured in different orders.

Notification bar 300b comprises icons for each of the applications or functions that have generated a notification, and a number adjacent each icon indicating the number of notifications generated by that application or function. Thus, for the illustrated example, there are ten message notifications, three missed phone calls and ten social networking notifications.

Further variations on the contents of FIG. 8 are contemplated. For example, the location, size, fonts, colour of notification bar 300b and content region 304b can be varied. For example, notification bar 300b may appear at the bottom of display 110b, or vertically on the sides of display 110b.

Figure 9:
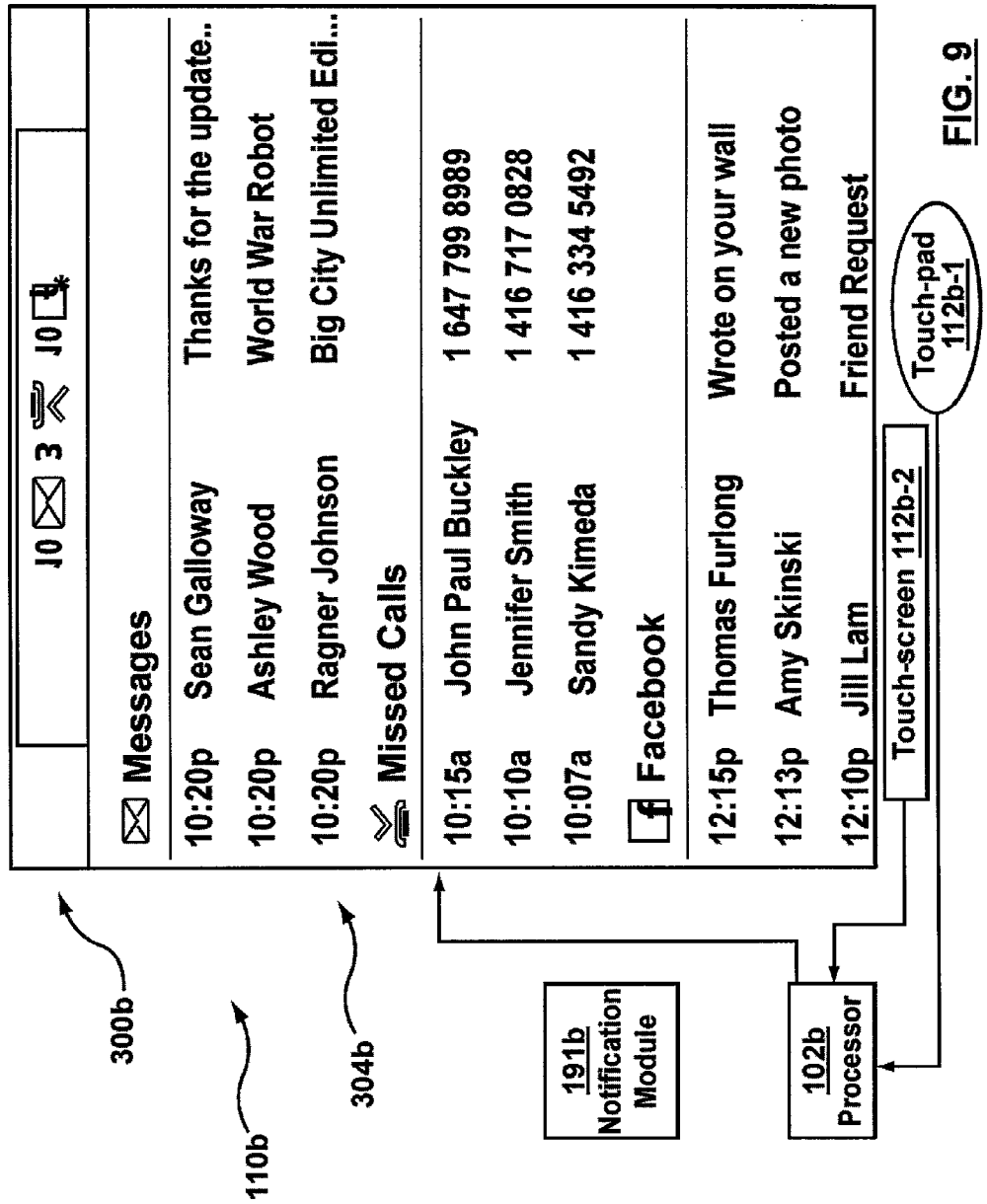
FIG. 9 is an example of a second screen generated on the display of the mobile device of FIG. 6.

As will be discussed further below, navigation can be effected via the notification bar 300b to bring notification content into the content region 304b as shown in the example of FIG. 9, and to remove notification content from the content region 304b.

Figure 10:
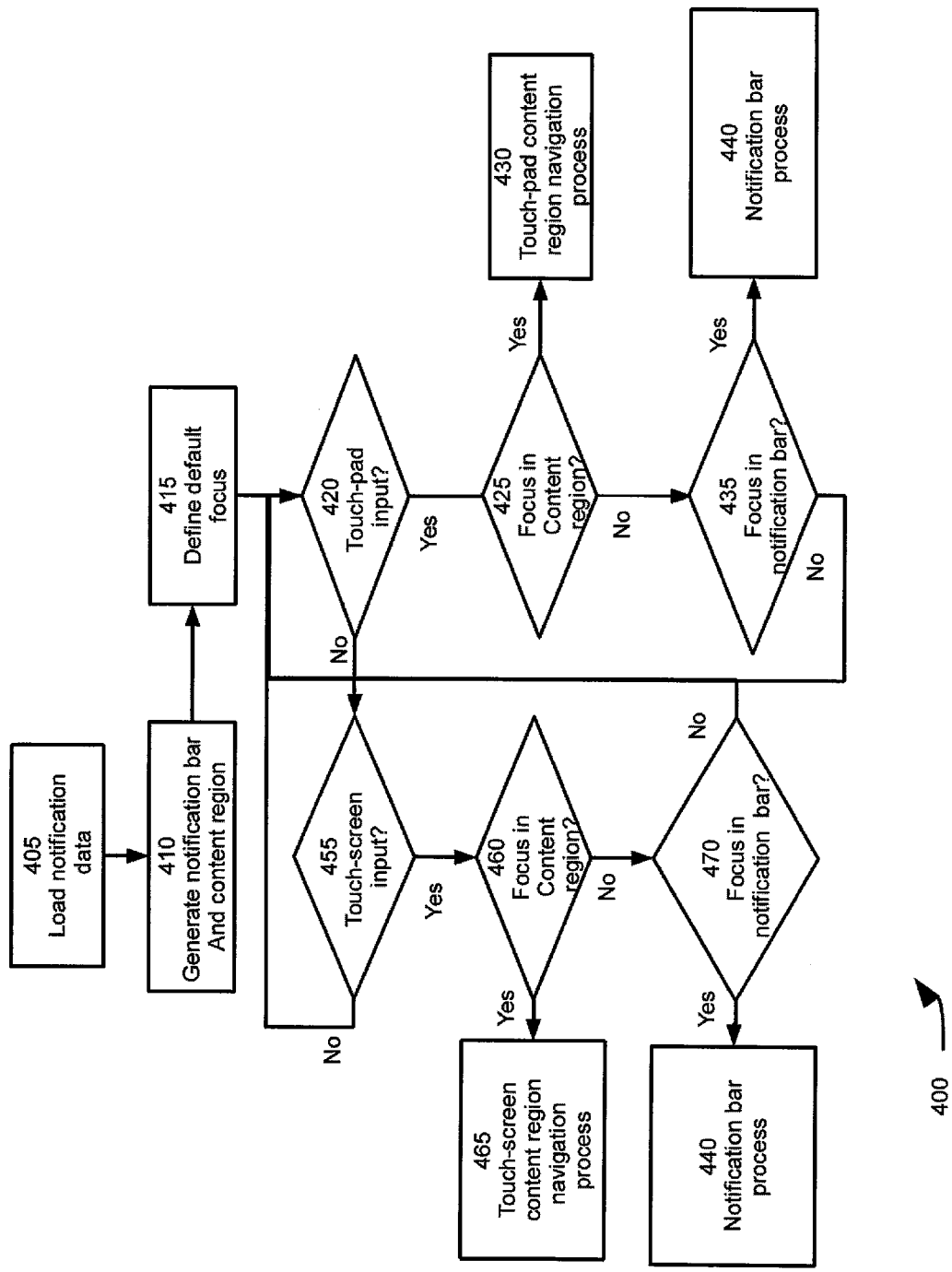
FIG. 10 shows a flowchart depicting a method of controlling a display using input received from one or more input devices.

In addition to the various configurations for display 110b, various methods for controlling the display 110b based on input from one or more input devices are also provided herein. One implementation of this specification provides a method for configuring a processor to control a display comprising a notification bar region and a content region. The method also contemplates the connection of a touch screen input device and a touch pad input device to the processor. The processor is configured to respond to input from either the touch screen input device or the touch pad input device to either navigate within a particular content region, or navigate between different content regions in association with the notification bar. FIG. 10 shows a method, in the form of a flow-chart, indicated generally at 400, outlining a non-limiting example of such a method for controlling a display based on input from one or more input devices, which can be implemented for example via notification application 191b. Method 400 can be implemented using device 100b, or variations thereon. For purposes of explanation, method 400 will be discussed in relation to FIG. 8 and FIG. 9.

Block 405 comprises loading notification data, such as notification of received messages, missed phone calls, etc. Block 405 can be effected by loading notification module 191b into RAM 106b for execution on processor 102b. Additionally, block 405 comprises loading contents of the notification bar 300b and content region 304b. It is to be understood that notification module 191b can be used with any application on device 100b, including, by way of non-limiting example, message application 138b, PIM 142b, or any additional application 197b such as phone, social networking, etc. Specific, non-limiting examples will be discussed in greater detail below.

For purposes of explaining block 405, it is assumed that the contents of notification bar 300b and content region 304b as shown in FIG. 8 are loaded.

Block 410 comprises generating the notification bar 300b and content region 304b based on the data loaded at block 405. FIG. 8 shows example performance of block 410 as processor 102b is shown as controlling display 110b to generate notification bar 300b and content region 304b.

Block 415 comprises establishing a default focus. As used herein the term focus is used in the sense that it is normally used with computing interfaces, whereby a pointing device can be used to bring a particular item or component on a graphical interface that is currently selected to receive input. It should be noted that block 415 is optional, in that an initial focus on display 110b can be effected by other means. In the case of touch screen input, a default or initial area of focus is not typically needed because the selection of an area on the touch screen inherently defines the initial focus. By the same token, a cursor can be used via touch-pad input in order to select initial focus. A default focus according to block 415 can, however, be desired where no cursor is included as part of the generation of a screen.

Block 420 comprises determining if there has been any touch-pad input. In device 100b, processor 102b is configured to determine if any electrical signals from touch-pad 112b-1 have been received as part of block 420. A "no" determination at block 420 leads to block 455.

A "yes" determination at block 420 leads to block 425 which comprises determining if focus is within the content region. A "yes" determination at block 425 leads to block 430 which comprises navigation via touch-pad input, where such navigation occurs within the context of focus having been originally invoked within the content region. Such touch pad input can comprise, for example, one or more vertical swipes along touch pad 112b-1; or one or more horizontal swipes along the touch pad 112b-1; or both. Touch-pad content region navigation process 430 may be used to navigate between, launch and/or invoke functions of the various applications identified by the icons illustrated in FIG. 8, such as email messaging, text messaging, PIM, calendar, browsing, etc. Such navigation, launching, etc. may be initiated by depression (i.e. "clicking") of the touch pad 112b-1. The principles of operation of the process represented by block 430 will be known to a person of skill in the art.

A "no" determination at block 425 leads to block 435 which comprises determining if there is focus in the notification bar 300b. A "yes" determination at block 435 leads to block 440 which comprises a notification bar process, discussed in greater detail below with reference to FIGS. 11-22. Again, such touch pad input can comprise, for example, one or more vertical swipes along touch pad 112b-1; or one or more horizontal swipes along the touch pad 112b-1; or both.

A "no" determination at block 435 leads to block 455.

Block 455 comprises determining if there has been any touch-screen input. In device 100b, processor 102b is configured to determine if any electrical signals from touch-screen 112b-2 have been received as part of block 455. A "no" determination at block 455 leads back to block 420.

Block 460, like block 425, comprises determining if the focus is in the content region. However, block 460 is distinguished from block 425 in that block 460 relates to focus and input actions that are received via input from touch-screen

112b-2. A "yes" determination leads to block 465 which results in navigation, or invocation of a selection, or both of them via touch-screen input, within the context of focus having been received from within the content region. Where an invocation of a selection, via, for example, a tap input received on touch-screen 112b-2 is received at block 465, then such a tap input is interpreted by processor 102b as equivalent to depression of touch-pad 112b-1 as discussed in relation to block 430. As discussed in relation to block 430, such a tap input received at block 465 may result in navigating between, launching and/or invoking functions of the various applications identified by the icons illustrated in FIG. 8, such as email messaging, text messaging, PIM, calendar, browsing, etc. The principles of operation of the process represented by block 465 will be known to a person of skill in the art.

A "no" determination at block 460 leads to block 470 which, like block 425, comprises determining if the focus is in the notification bar 300b. However, block 470 is distinguished from block 435 in that block 460 relates to focus and input actions that are received via input from touch-screen 112b-2. A "yes" determination at block 470 leads to block 440 which comprises the notification bar process, as discussed above and an example of which is described below with reference to FIGS. 11-22.

Figure 11:
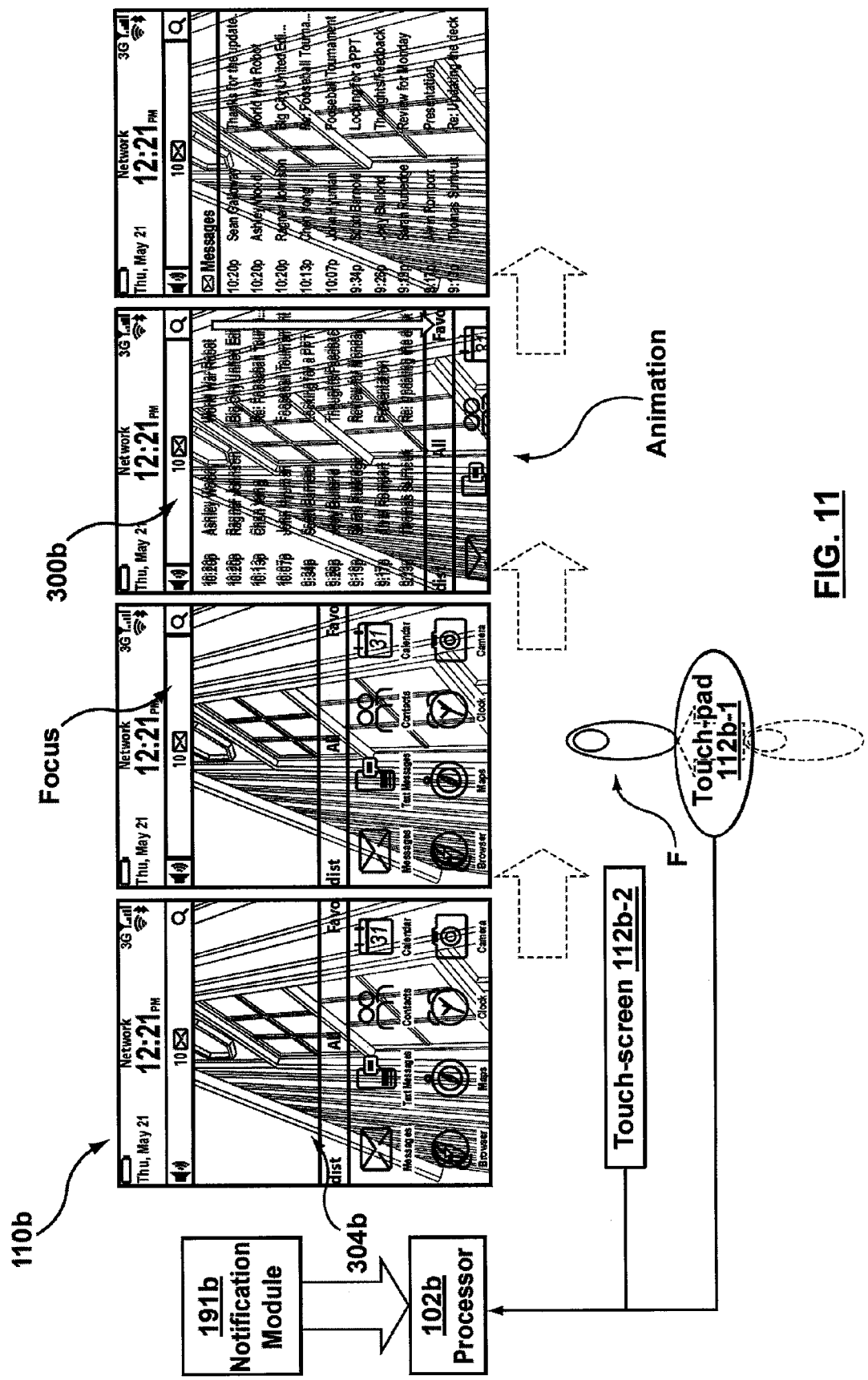
FIG. 11 shows example screens generated on the display of the mobile device of FIG. 6 using the method of FIG. 10.
Figure 13:
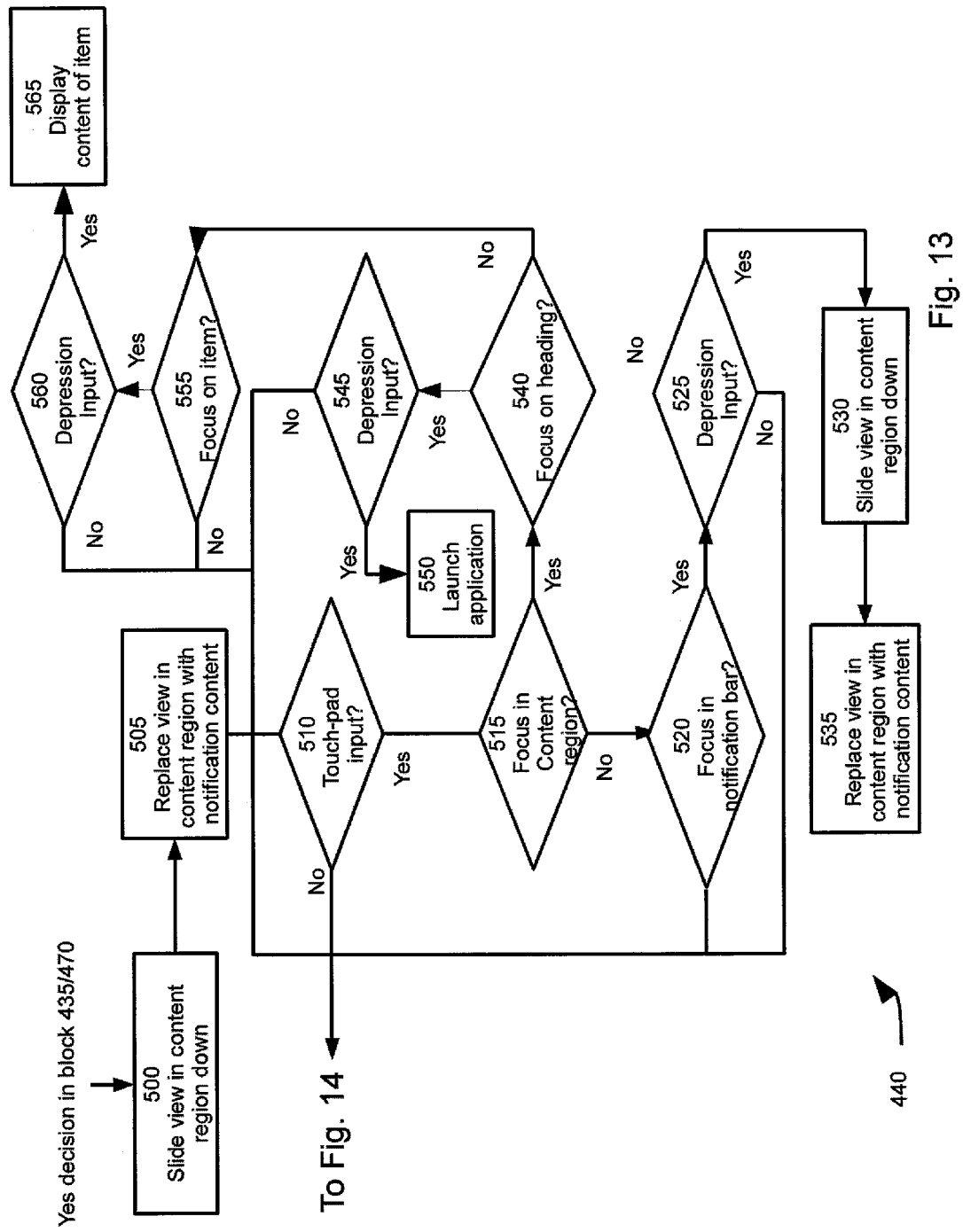
FIG. 13 shows a flowchart depicting a method of controlling a display using input received from a touch-pad input device.
Figure 14:
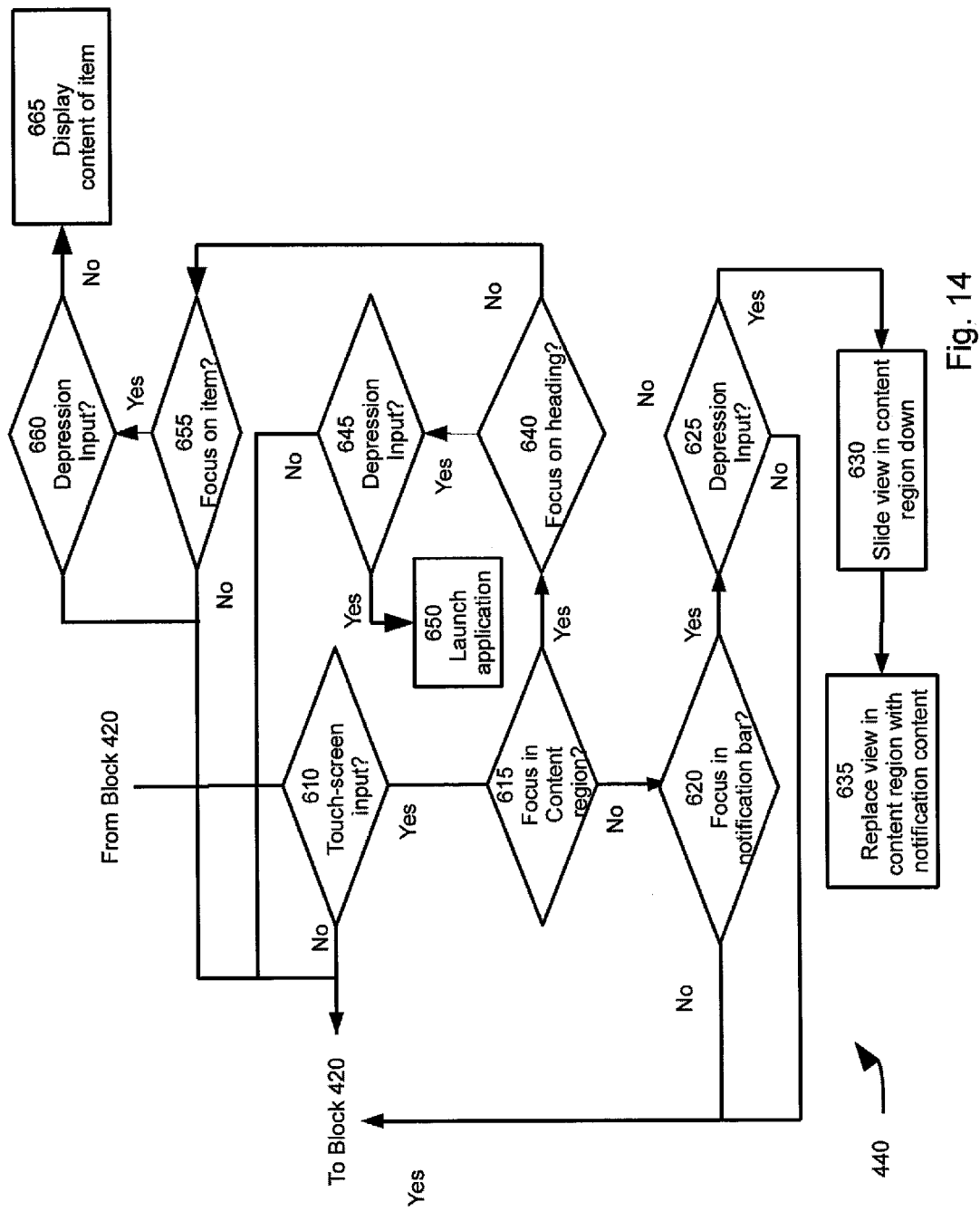
FIG. 14 shows a flowchart depicting a method of controlling a display using input received from a touch-screen input device.

FIG. 11 shows example performance of a first aspect of block 440, resulting from a "Yes" decision at block 435. In FIG. 11, vertical sliding of a Finger F, over touch pad 112b-1, leads to processor 102b controlling display 110b to move focus to the notification bar 300b, as indicated by the screen transition represented by the left-most arrow in FIG. 11, thereby resulting in the "Yes" decision at block 435. As depicted in the flowchart of FIG. 13, in response to the notification bar receiving focus, block 500 is effected by the processor 102b controlling display 110b to perform a screen animation whereby the view displayed in content region 304b is caused to move e.g. slide) downward and out of sight, as indicated by the screen transition represented by the middle arrow in FIG. 11. Next, at block 505, the processor 102b controls display 110b to replace the content with a view that shows notification content, as illustrated in the example screen on the far-right of FIG. 11, and as indicated by the screen transition represented by the right-most arrow in FIG. 11.

Figure 12:
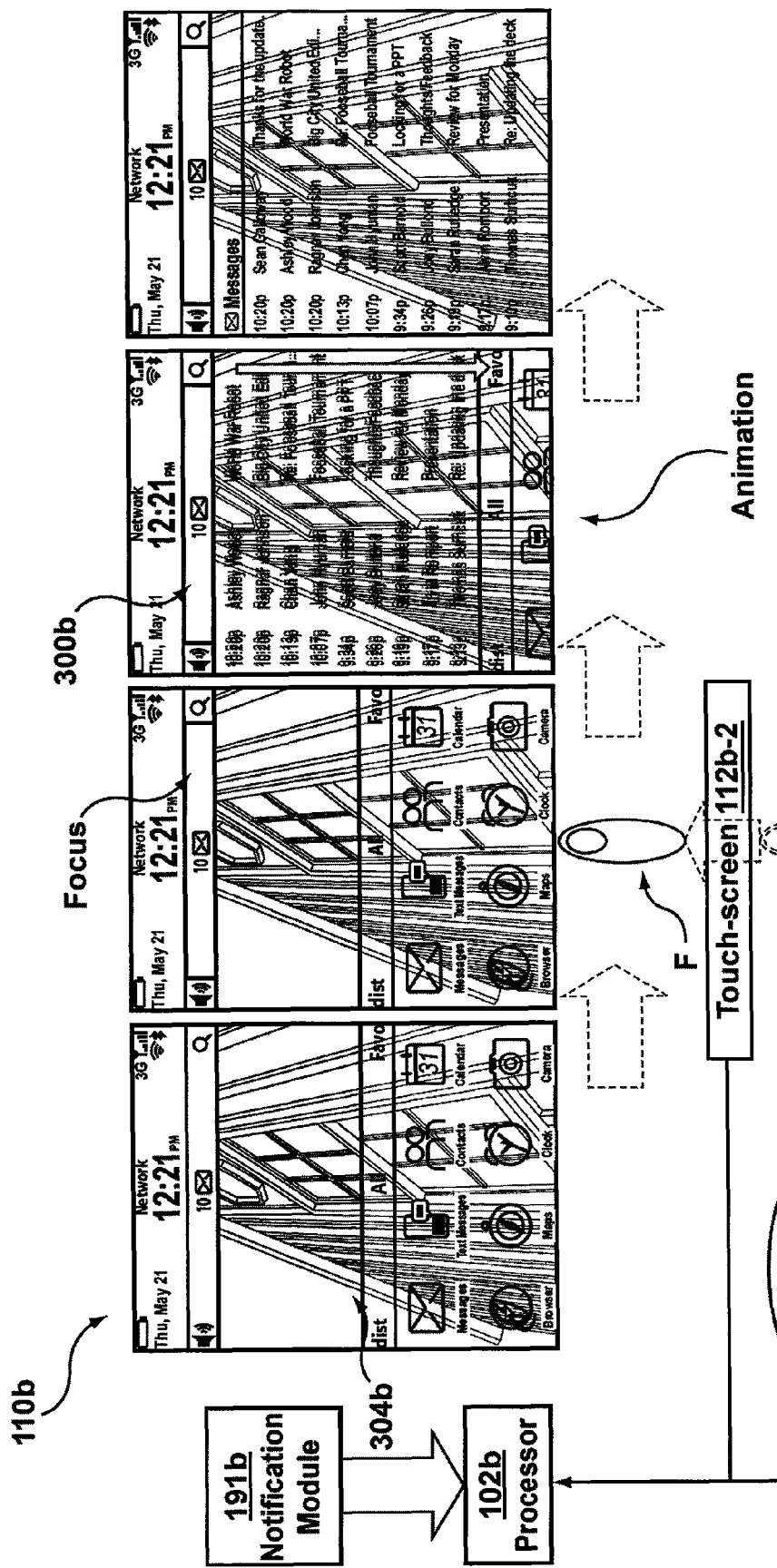
FIG. 12 shows example screens generated on the display of the mobile device of FIG. 6 using the method of FIG. 10.

FIG. 12 shows performance of the afore-noted first aspect of block 440, resulting from a "Yes" decision at block 470. In all other respects this aspect of block 440 functions in a similar manner as shown in FIG. 11.

At block 510 of FIG. 13, a determination is made as to whether there has been an input via touch pad 112b-1. If not, then the process proceeds to FIG. 14, described in greater detail below. If processor 102b determines that there has been an input via touch pad 112b-1, then a determination is made at block 515 as to whether focus has moved to the content region 304b. If not, a further determination is made at block 520 as to whether focus has moved to the notification bar 300b. If not, the process proceeds to FIG. 14.

If processor 102b determines that focus has moved to the notification bar 300b, then a determination is made at block 525 as to whether there has been a depression input of the touch pad 112b-1 (e.g. a "click" on the notification bar 330b). If not, the process proceeds to FIG. 14.

Figure 15:
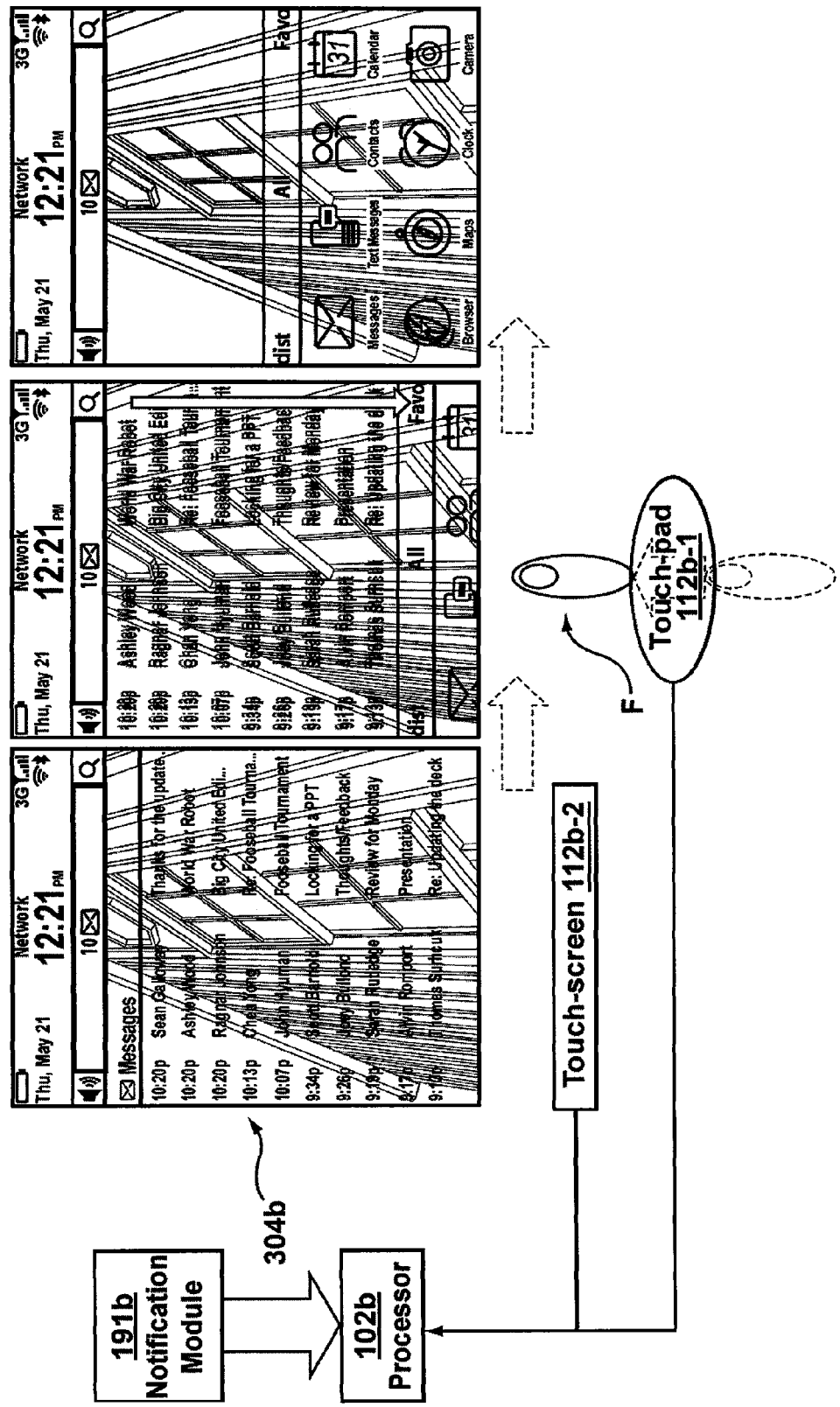

If a depression is detected at block 525, then a second aspect of block 440 is performed, as indicated in FIG. 15, whereby a reverse screen animation is initiated at block 530 such that the view depicting notification content is caused to move (i.e. slide) downward and out of sight from content region 304b, as indicated by the screen transition represented by the left-hand arrow in FIG. 15. Next, at block 535, the processor 102b controls display 110b to replace the content region with the original view depicted in FIG. 8, as indicated by the screen transition represented by the right-hand arrow in FIG. 15.

According to other embodiments, the process of blocks 530 and 535 may be initiated as a result of an input other than depressing the touch pad 112b-1. For example, the process of blocks 530 and 535 may be initiated as a result of activating an 'escape' button (not shown), or other input to device 100b.

Figure 17:
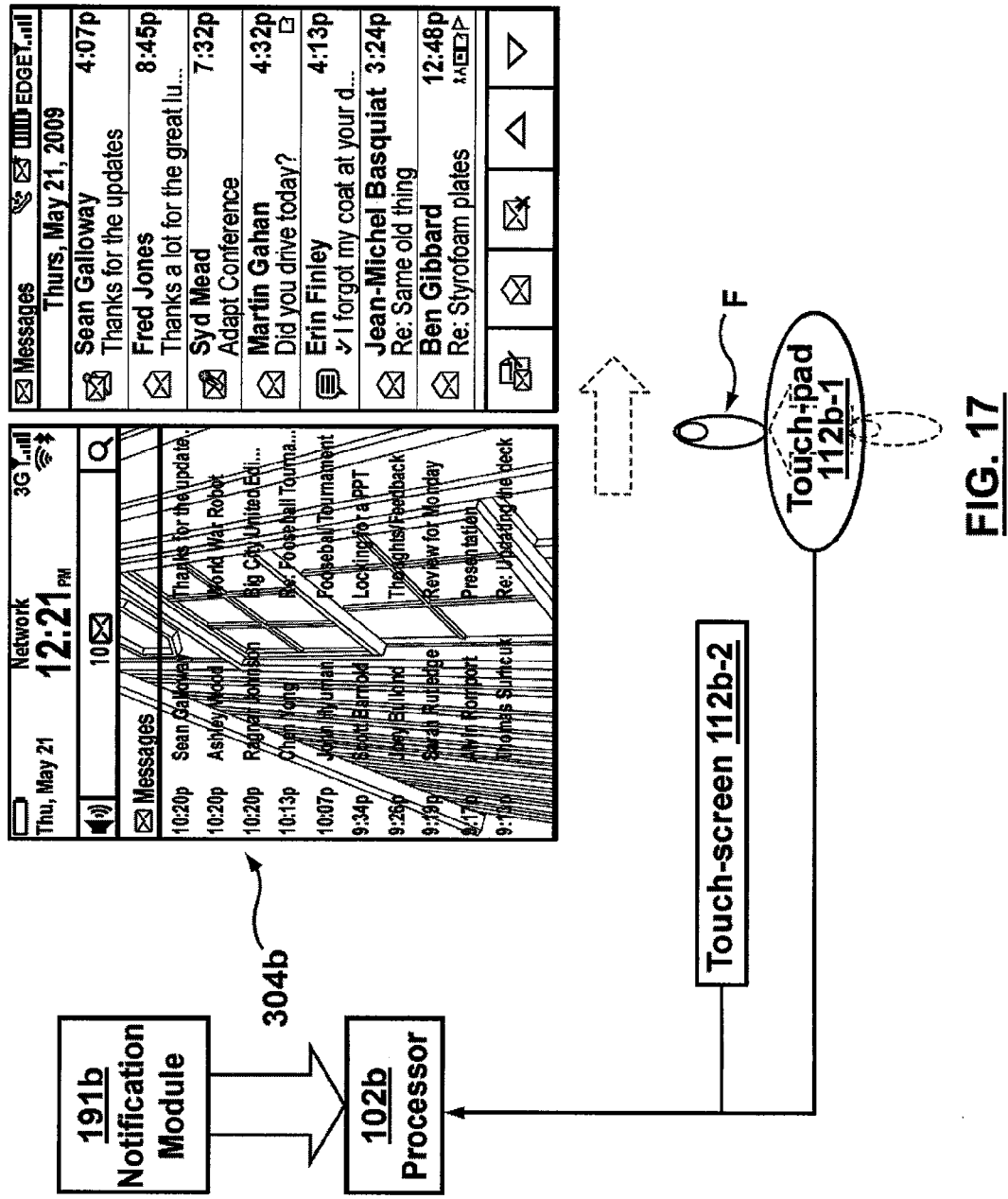

If a determination is made at block 515 that focus has moved to the content region 304b, a further determination is made at block 540 as to whether focus has moved to an application or function heading, as shown in the non-limiting example of FIG. 17. If yes, then a further determination is made at block 545 as to whether there has been a depression input of the touch pad 112b-1 (e.g. a "click"). If yes, then a third aspect of block 440 is performed whereby the application indicated by the heading is launched by processor 102b at block 550, as shown in the right-hand screen of the example depicted in FIG. 17, and as indicated by the screen transition represented by the arrow. If there has been no depression as determined at block 545, then the process returns to block 510.

Figure 18:
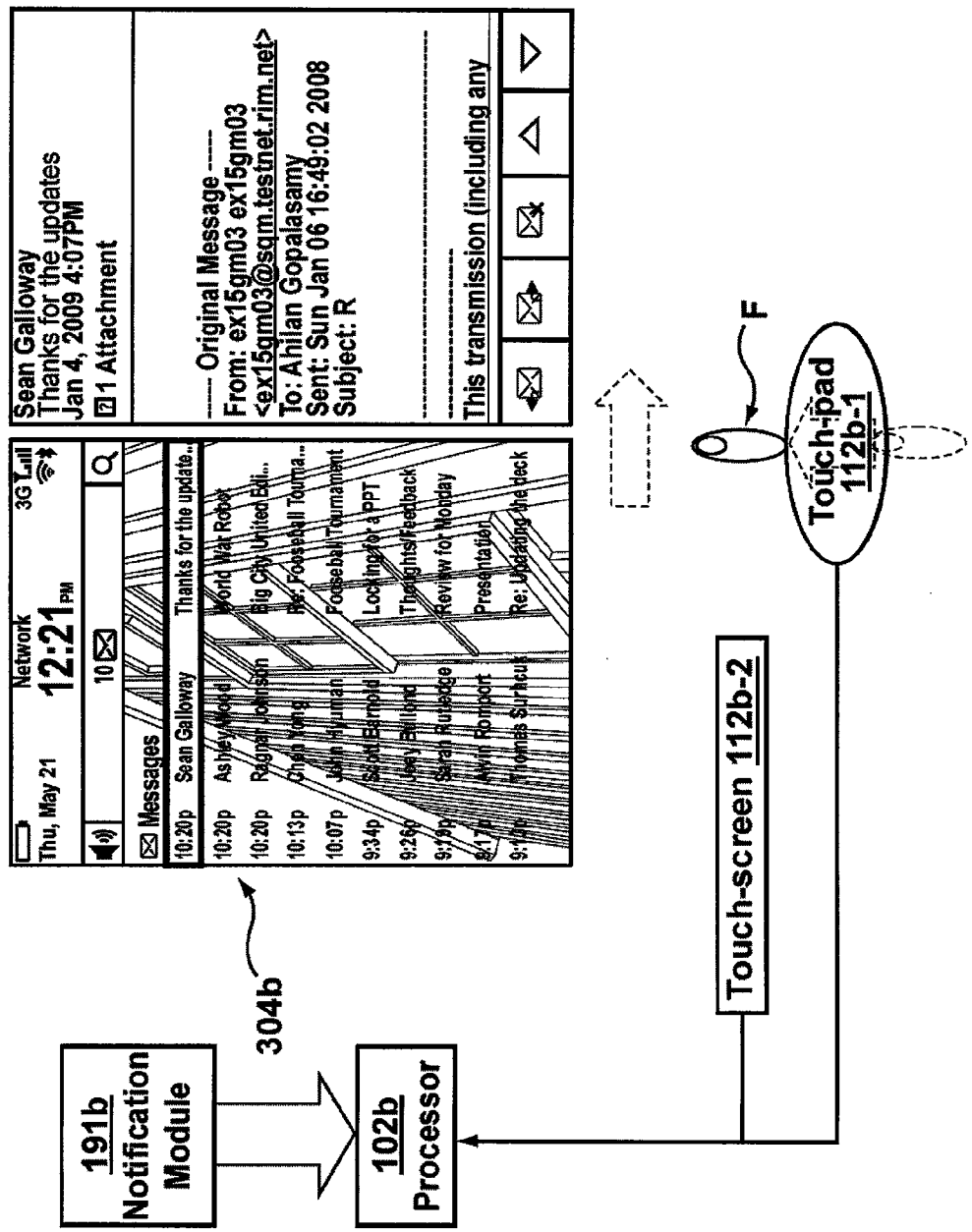

If it is determined at block 540 that focus has not moved to an application heading, then a further determination is made at block 555 as to whether focus has moved to a row item in the notification list appearing in content region 300b, as shown in the left-hand screen for the example depicted in FIG. 18. If not, then the process returns to step 510. If yes, then a further determination is made at block 560 as to whether there has been a depression input of the touch pad 112b-1 (e.g. a "click"). If yes, then a fourth aspect of block 440 is performed whereby the content for the highlighted row item is caused to be displayed by processor 102b at block 565, as shown in right-hand screen for the example depicted in FIG. 18, and as indicated by the screen transition represented by the arrow. If there has been no depression as determined at block 560, then the process returns to block 510.

Returning to FIG. 14, following a "No" decision at step 510, a determination is made at block 610 as to whether there has been an input via touch screen 112b-2. If not, then the process returns to block 420. If processor 102b determines that there has been an input via touch screen 112b-2, then a determination is made at block 615 as to whether focus has moved to the content region 304b. If not, a further determination is made at block 620 as to whether focus has moved to the notification bar 300b. If not, the process returns to block 420.

If processor 102b determines that focus has moved to the notification bar 300b, then a determination is made at block 625 as to whether there has been a depression input of the touch screen 112b-2 (e.g. a "click" on the notification bar 330b). If not, the process returns to block 420.

Figure 16:
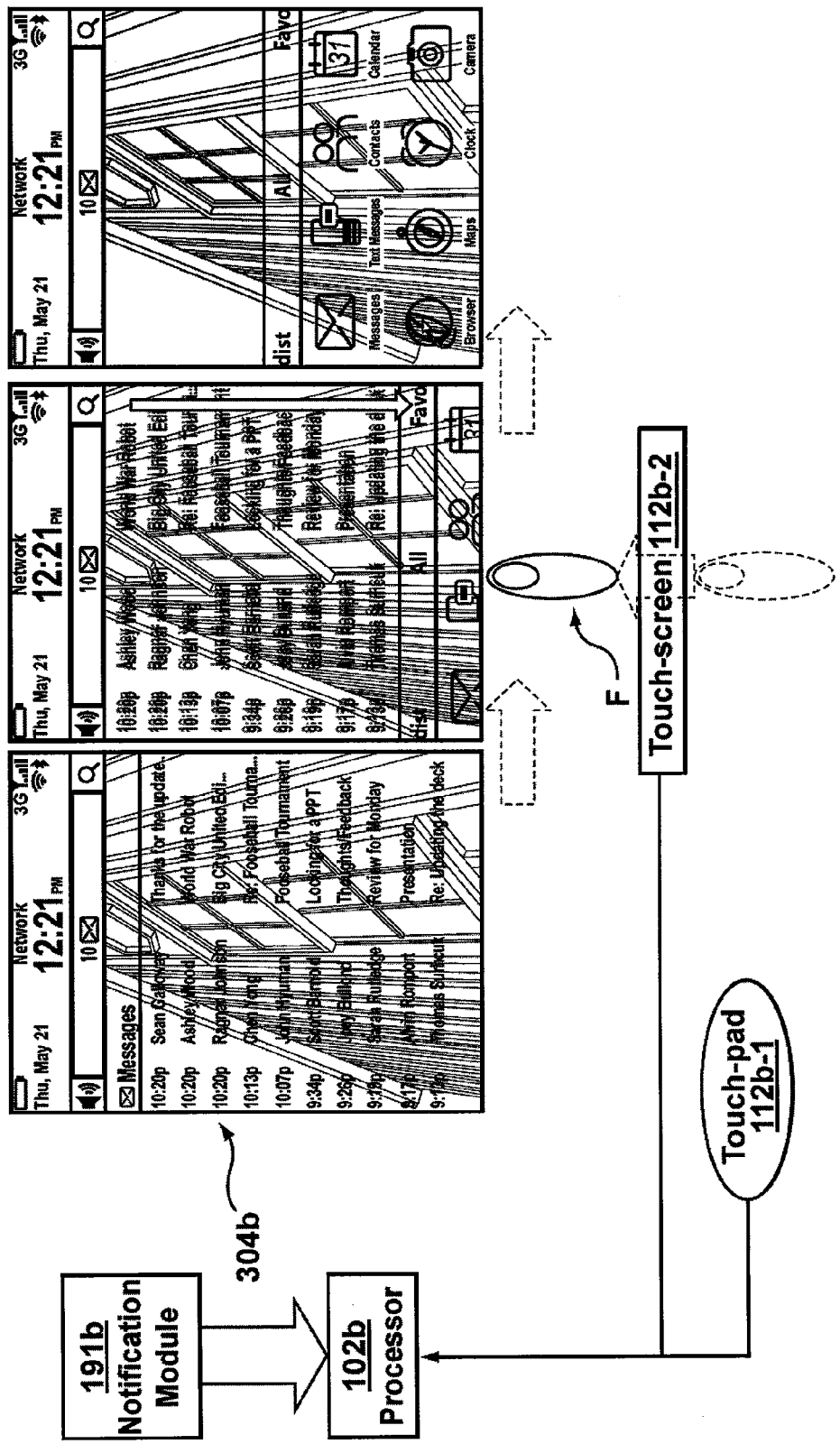

If a depression is detected at block 625, then the afore-noted second aspect of block 440 is performed, as indicated in FIG. 16, whereby a reverse screen animation is initiated at block 630 such that the view depicting notification content is caused to move (i.e. slide) downward and out of sight from content region 304b, as indicated by the screen transition represented by the left-hand arrow in FIG. 16. Next, at block 635, the processor 102b controls display 110b to replace the content with the original view depicted in FIG. 8, as indicated by the screen transition represented by the right-hand arrow in FIG. 16.

Figure 19:
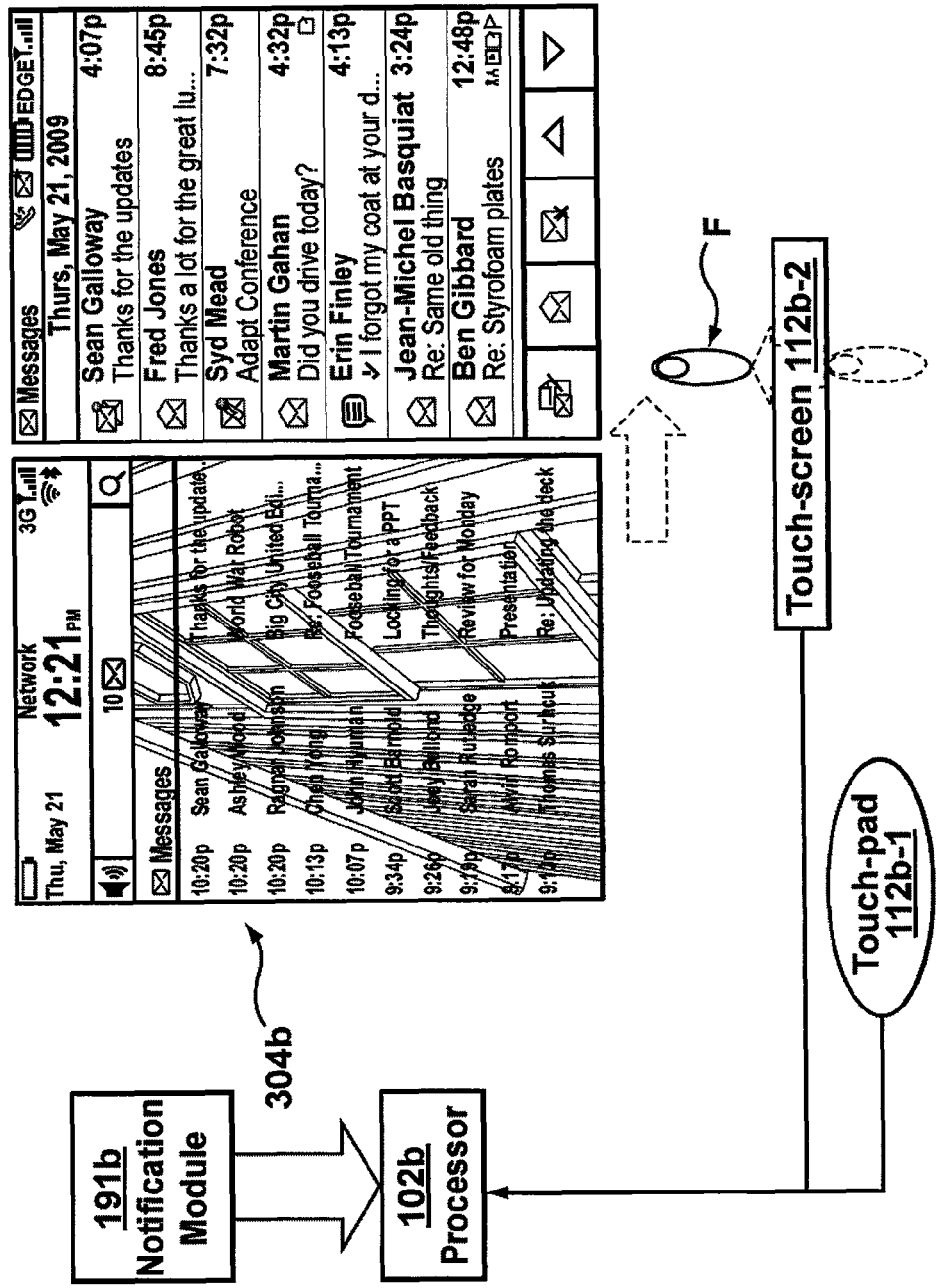

If a determination is made at block 615 that focus has moved to the content region 304b, a further determination is made at block 640 as to whether focus has moved to an application or function heading, as shown in the non-limiting example of FIG. 19. If yes, then a further determination is made at block 645 as to whether there has been a depression input (e.g. a "tap") of the touch screen 112b-2. If yes, then the afore-noted third aspect of block 440 is performed whereby the application indicated by the heading is launched by processor 102b at block 650, as shown in right-hand screen for the example depicted in FIG. 19. If there has been no depression as determined at block 645, then the process returns to block 420.

Figure 20:
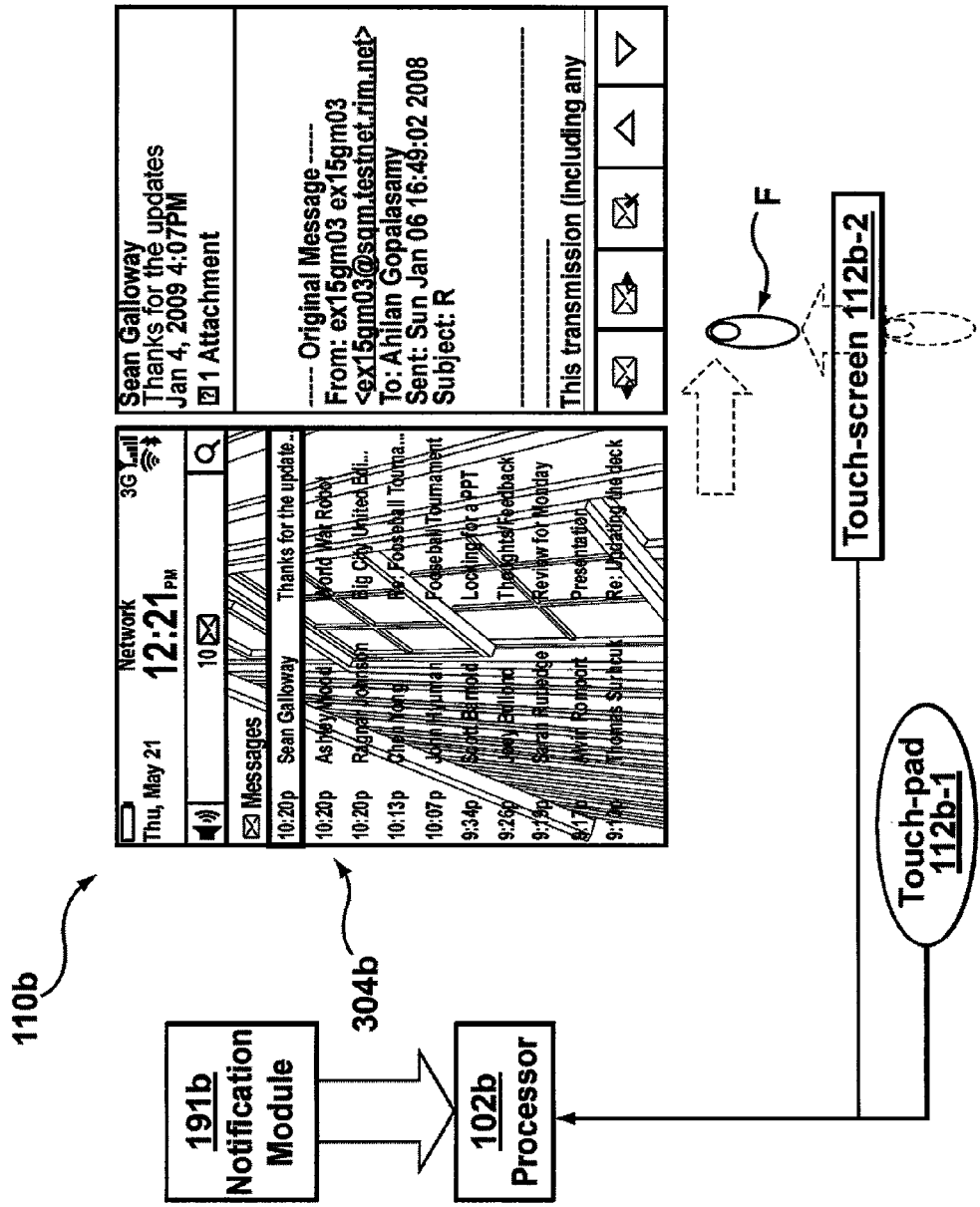

If it is determined at block 640 that focus has not moved to an application heading, then a further determination is made at block 655 as to whether focus has moved to a row item in the notification list appearing in content region 300b, as shown in the left-hand screen for the example depicted in FIG. 20. If not, then the process returns to block 420. If yes, then a further determination is made at block 660 as to whether there has been a depression input (i.e. a "tap") of the touch screen 112b-2. If yes, then the afore-noted fourth aspect of block 440 is performed whereby the content for the highlighted row item is caused to be displayed by processor 102b at block 665, as shown in right-hand screen for the example depicted in FIG. 20. If there has been no depression as determined at block 660, then the process returns to block 420.

Figure 21:
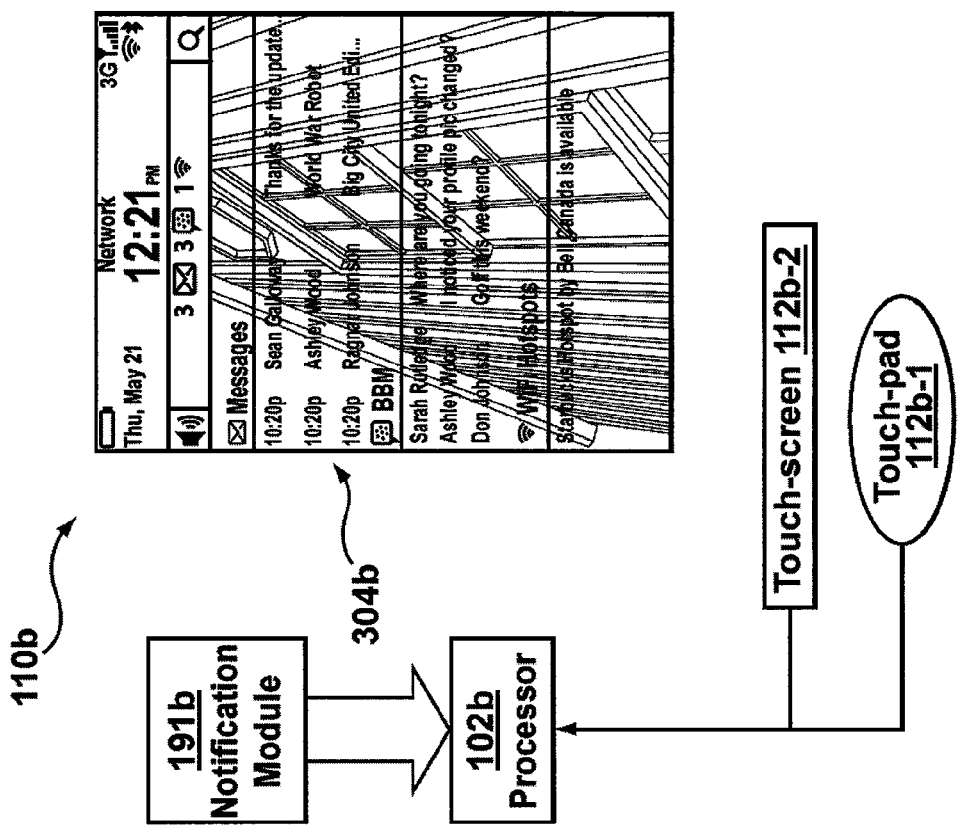

According to a non-limiting embodiment, display 110b may depict multiple rows of notification items, under control of processor 102b, arranged in tabular form, as shown in FIG. 21. It will be noted that the tabular layout may include a single column (e.g. as shown under the application heading "WiFi Hotspots"), or multiple columns (e.g. two columns shown under the application heading "BBM" or three columns under the heading "Messages").

Figure 22:
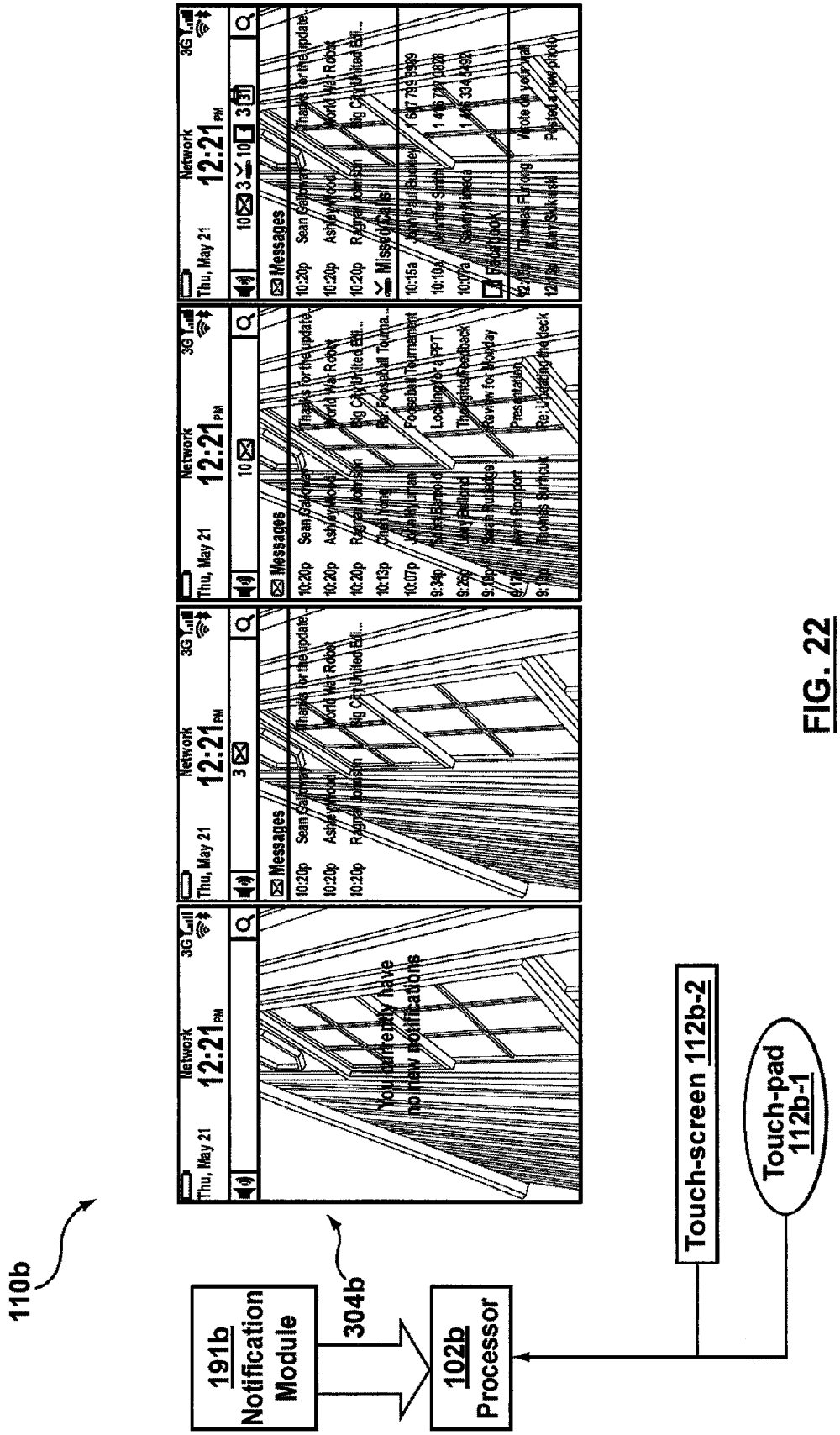

Also, according to another non-limiting embodiment, display 110b may arrange the layout of content region 304b based on the amount of notification content available for display. For example, as shown in FIG. 22, display 110b may depict a generic message indicating that there are no new notifications, or it may depict a small number of notifications where only a small number are available for display, or it may utilize the full display area to depict a large number of notifications, and in the event of a large number of notifications from multiple applications, the display may show multiple notifications arranged beneath each of a plurality of application headers, as shown in the right-most screen of FIG. 22.

Figure 23:
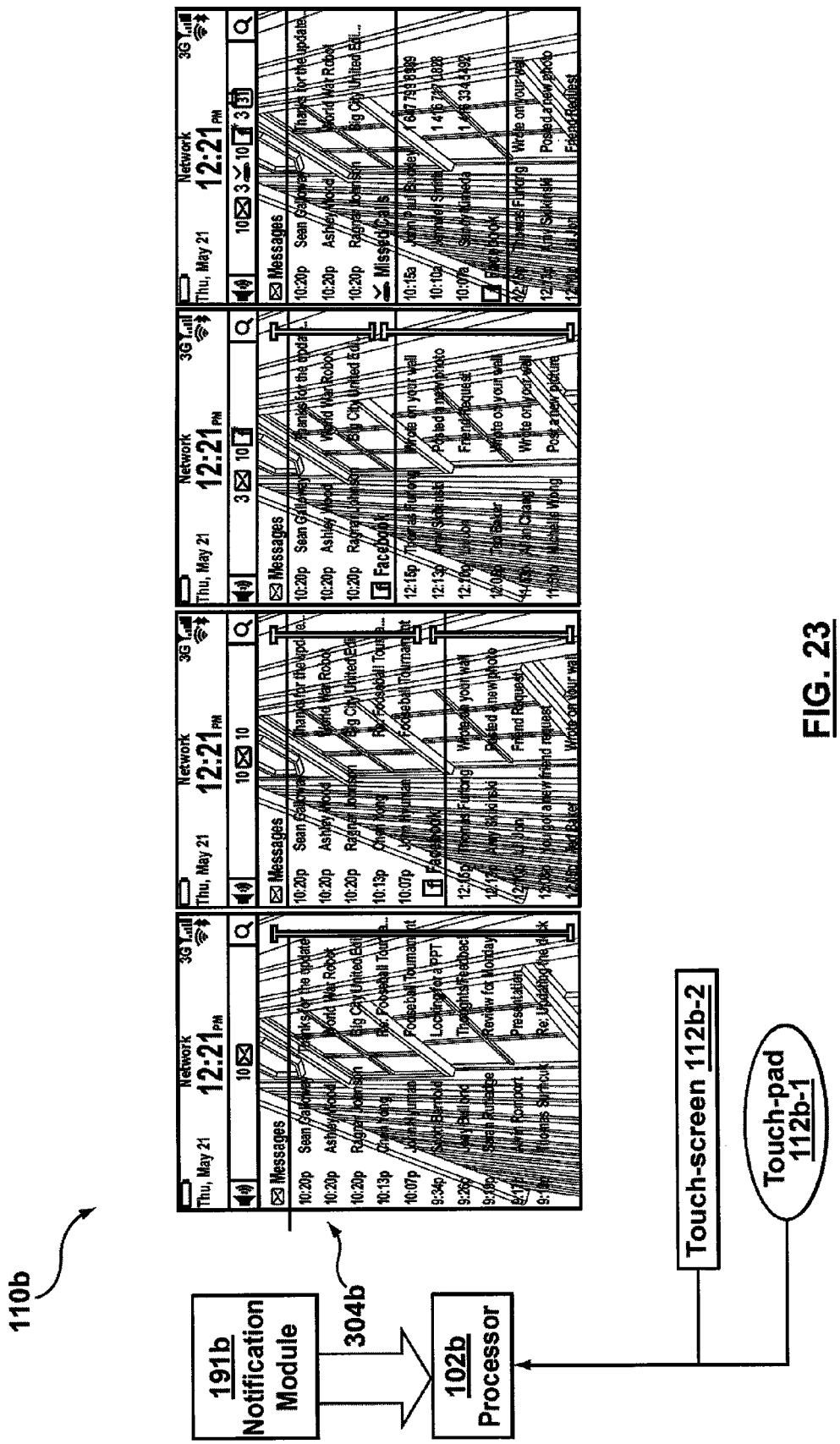

According to another non-limiting example, for multiple notifications from only a single application all notifications may be arranged under the applications heading, as shown in the left-most screen of FIG. 23. When there are two types of notification, screen real estate may be maximized as shown in the middle two screens of FIG. 23. When there are more than three notification types, a default layout may be adopted by processor 102b for causing the display 110b to show three row items beneath each application header, as shown in the right-most screen of FIG. 23. Also, if the number of applications exceeds the size of the display, then a scroll bar may be provided for scrolling down to see the remaining information, also shown in the right-most screen of FIG. 23.

It is also contemplated that notification module 191b may allow for customizing the view of notifications appearing in content regions 304b. A non-limiting example of how such customization may be performed is provided in FIG. 24. For economy of presentation, the processor 201b and notification module 191b are not illustrated, but are incorporated within the device 100b, and communicate in the manner set forth above with reference to FIGS. 7-23. Also, in the embodiment of FIG. 24, auxiliary inputs 112b-3 are shown in the form of phone call start button 112b-3i, menu button 112b-3ii, escape button 112b-3iii and phone call end button 112b-3iv.

In operation, upon activation of the menu button 112b-3ii, as depicted in the left-most screen display, and selection of a "Define Today View" menu item (e.g. by depressing (clicking) the button 112b-3ii, an animation occurs whereby a screen of presentation options slides up into the content region 304b, as indicated by the screen transition represented by the left-most arrow in FIG. 24, resulting in display of one of either a list of notification generating applications, as shown in the upper-right screen display, or a list of notification generating applications along with associated accounts, as shown in the lower-right screen display.

Figure 25:
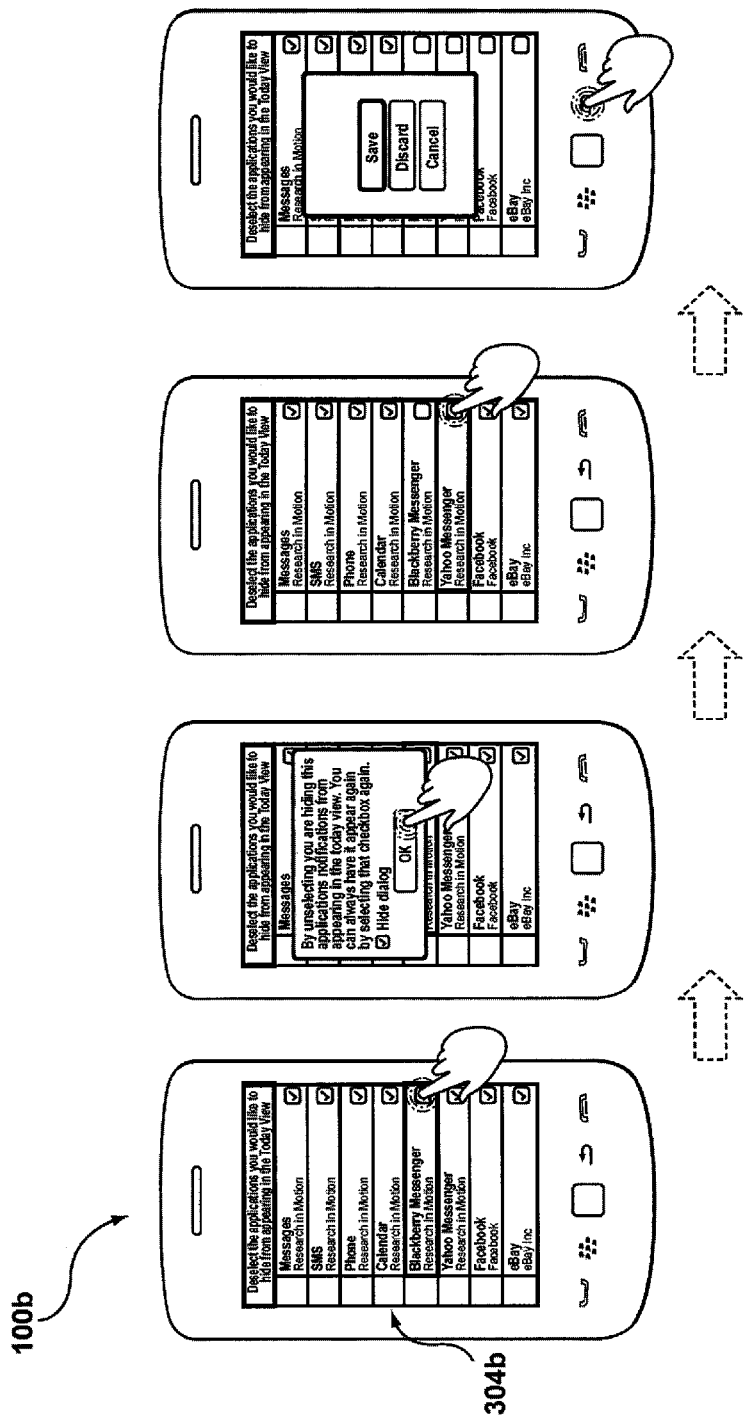

From the list of notification-generating applications, individual applications may be de-selected, by depressing (i.e. tapping) the touch-screen 112b-2, as shown in the left-most screen display of FIG. 25. The processor 102b may than optionally generate a display prompt, as depicted in the second screen display from the left in FIG. 25, to acknowledge that by un-checking an application no further notifications will be appear in the notification bar 300b for that application. Then, the un selected application will appear in the screen display without a check mark, as shown in the third screen display from the left in FIG. 25, and notifications therefrom will only appear as "badged" on any screen display that shows the application icon but not on the notification bar 300b. Finally, upon activation of escape button 112b-3iii, the notification preferences are saved, as shown in the right-most screen display of FIG. 25.

Figure 26:
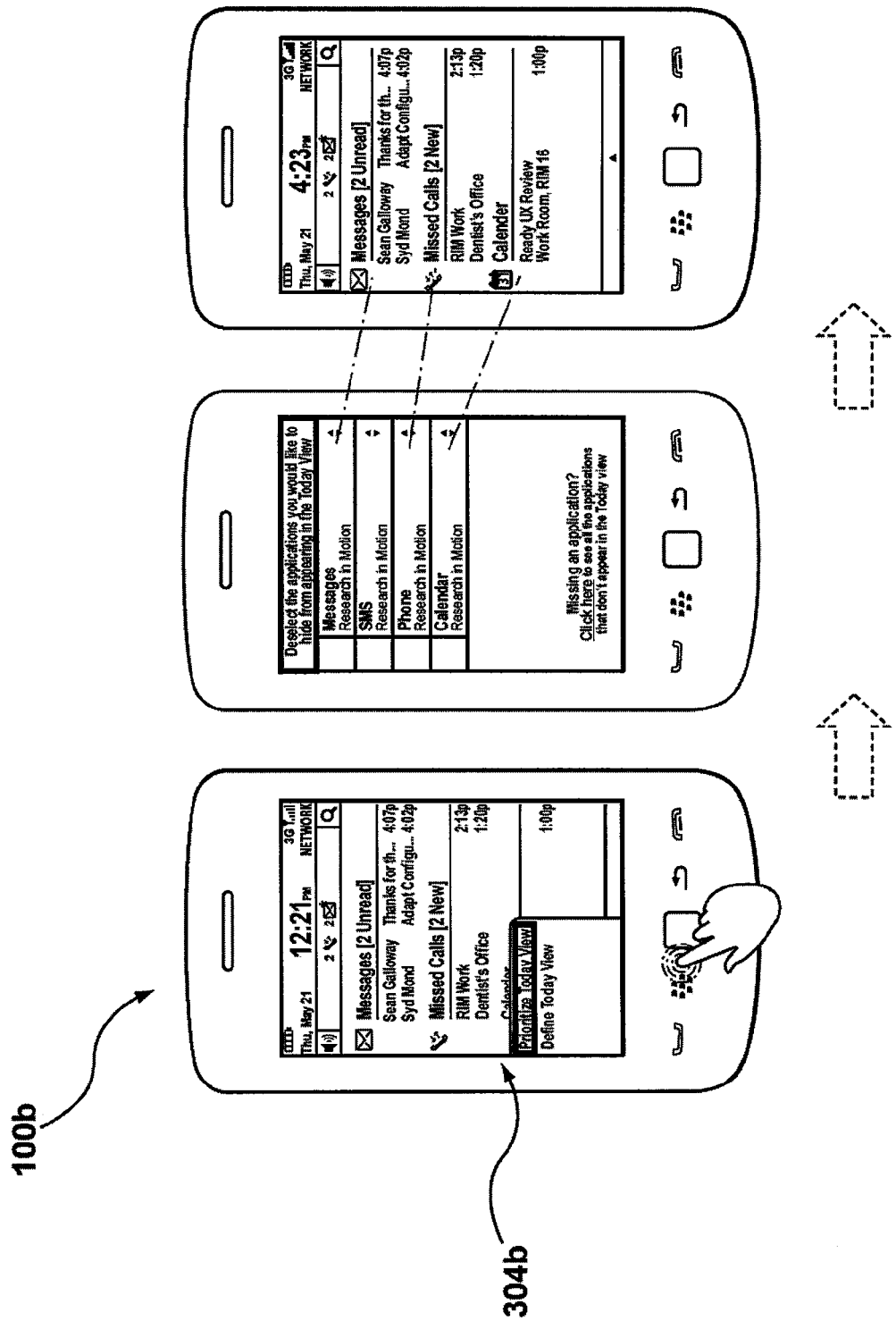

Additionally, it is contemplated that in some embodiments the layout priority of application appearing in the content region 304b may be customized. Thus, as shown in the non-limiting example of FIG. 26, upon activation of the menu button 112b-3ii, as depicted in the left-most screen display, and selection of a "Prioritize Today View" menu item (e.g. by depressing (clicking) the button 112b-3ii, a list of active applications is presented, as depicted in the second screen display form the left in FIG. 26, where the active applications are those that pass notifications for viewing via the notification bar 300b. The order of priority for display of these applications can then be changed by tapping and moving the applications via touch-screen 112b-2, resulting in a re-ordered list of applications as shown in the right-most screen display of FIG. 26.

Figure 27:
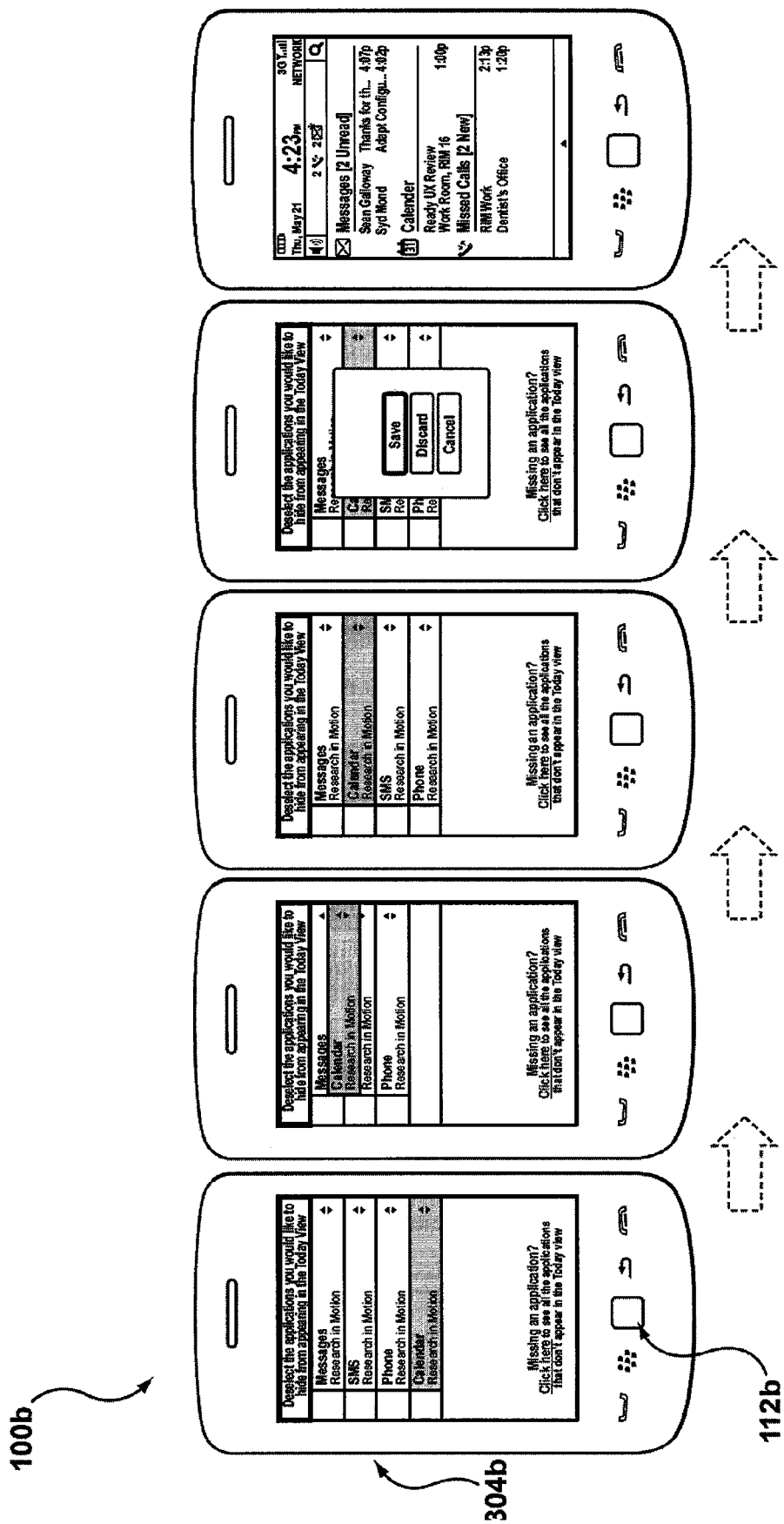

In an alternative embodiment, the priority order of the applications may be re-arranged via manipulation of touchpad 112b-1, as depicted in the sequence of screen images in FIG. 27.

Variations, subsets, enhancements and combinations of the foregoing are contemplated.

The invention claimed is:

1. A method for controlling a display using a display based on input from one or more input devices to generate application notifications, comprising:

controlling a display to generate a notification bar region and a content region, said notification bar region distinct from a status bar, said notification bar region and said content region displayed simultaneously, said notification bar comprising an icon representing each application from which a notification has been generated and a number adjacent said icon for indicating how many notifications have been generated by said application; said content region comprising content that corresponds to data for at least some of the notifications generated by each application, and said content in said content region comprises multiple notifications arranged beneath each of a plurality of simultaneously displayed application headers;

receiving input from an input device to either:
  generate said content in said content region responsive to causing said notification bar to receive focus, or
  navigate within said content region,
wherein said content in said content region further comprises said data for said at least some of the notifications; and
when said focus has moved to a given application heading and said given application heading has been selected via said input, launching a respective application by replacing, at said display, said notification bar region and said content region with a representation of said given application.

2. The method of claim 1, wherein said notification bar region is located at a top of said display and said content region is located there under.

3. The method of claim 1, wherein when said focus has moved to an item in a notification list in said data, and said item has been selected, said method further comprises said display causing said item to be displayed.

4. The method of claim 1, wherein said content in said content region comprises a generic message indicating that there are no new notifications when no new notifications are available.

5. The method of claim 1, wherein when said content exceeds the size of a display, a scroll bar is provided for scrolling down to provide remaining information.

6. The method of claim 1, further comprising customizing said content by:
  providing at least a list of notification generating applications;
  de-selecting individual applications from said list;
  providing an indication in said list that said individual applications have been deselected such that notifications there from will only appear as badged on any screen display that shows an associated application icon but not on said notification bar; and
  saving notification preferences.

7. The method of claim 1, further comprising customizing a layout priority of applications appearing in said content region by:
  providing at least a list of active applications where said active applications are applications that pass notifications for viewing via said notification bar; and,
  changing an order of priority for display of said active applications by moving said applications in said list via based on received input resulting in a re-ordered list of active applications.

8. A computing device comprising:
a processor interconnected with a display and one or more input devices, said processor enabled to control said display based on input from said one or more input devices to generate application notifications, said processor further enabled to:
control said display to generate a notification bar region and a content region, said notification bar region distinct from a status bar, said notification bar region and said content region displayed simultaneously, said notification bar comprising an icon representing each application from which a notification has been generated and a number adjacent said icon for indicating how many notifications have been generated by said application; said content region comprising content that corresponds to data for at least some of the notifications generated by each application, and said content in said content region comprises multiple notifications arranged beneath each of a plurality of simultaneously displayed application headers;

receive input from an input device to either:
  generate said content in said content region responsive to causing said notification bar to receive focus, or
  navigate within said content region,
wherein said content in said content region further comprises said data for said at least some of the notifications; and
when said focus has moved to a given application heading and said given application heading has been selected via said input, launch a respective application by replacing, at said display, said notification bar region and said content region with a representation of said given application.

9. The computing device of claim 8, wherein said notification bar region is located at a top of said display and said content region is located there under.

10. The computing device of claim 8, wherein when said focus has moved to an item in a notification list in said data, and said item has been selected, said processor causes said item to be displayed.

11. The computing device of claim 8, wherein said content in said content region comprises a generic message indicating that there are no new notifications when no new notifications are available.

12. The computing device of claim 8, wherein when said content exceeds the size of a display, said processor causes a scroll bar to be provided at said display for scrolling down to provide remaining information.

13. The computing device of claim 8, wherein said processor is further enabled to customize said content by:
  providing at least a list of notification generating applications;
  de-selecting individual applications from said list;
  providing an indication in said list that said individual applications have been deselected such that notifications there from will only appear as badged on any screen display that shows an associated application icon but not on said notification bar; and
  saving notification preferences.

14. The computing device of claim 8, wherein said processor is further enabled to customize a layout priority of applications appearing in said content region by:
  providing at least a list of active applications where said active applications are applications that pass notifications for viewing via said notification bar; and,
  changing an order of priority for display of said active applications by moving said applications in said list via based on received input resulting in a re-ordered list of active applications.

15. A computer program product, comprising a non-transitory computer usable medium having a computer readable program code adapted to be executed to implement a method for controlling a display using a processor based on input from one or more input devices to generate application notifications, the method comprising:
  controlling a display to generate a notification bar region and a content region, said notification bar region distinct from a status bar, said notification bar region and said content region displayed simultaneously, said notification bar comprising an icon representing each application from which a notification has been generated and a number adjacent said icon for indicating how many notifications have been generated by said application; said content region comprising content that corresponds to data for at least some of the notifications generated by each application, and said content in said content region comprises multiple notifications arranged beneath each of a plurality of simultaneously displayed application headers;

receiving input from an input device to either:
  generate said content in said content region responsive to causing said notification bar to receive focus, or
  navigate within said content region, wherein said content in said content region further comprises said data for said at least some of the notifications; and when said focus has moved to a given application heading and said given application heading has been selected via said input, launching a respective application by replacing, at said display, said notification bar region and said content region with a representation of said given application.

* * * * *

UNITED STATES PATENT AND TRADEMARK OFFICE
CERTIFICATE OF CORRECTION

| | | |
|---|---|---|
| PATENT NO. | : 8,775,963 B2 | Page 1 of 1 |
| APPLICATION NO. | : 12/849183 | |
| DATED | : July 8, 2014 | |
| INVENTOR(S) | : Alen Mujkic | |

It is certified that error appears in the above-identified patent and that said Letters Patent is hereby corrected as shown below:

In the Claims

Col. 22, line 54, Claim 1, should read:

1. A method for controlling a display [[using a display]] based on input from one or more input devices to generate application notifications, comprising:...

Signed and Sealed this
Eleventh Day of November, 2014

Michelle K. Lee
*Deputy Director of the United States Patent and Trademark Office*